(12) United States Patent
Douglas

(10) Patent No.: US 9,499,356 B2
(45) Date of Patent: Nov. 22, 2016

(54) HORIZONTAL SUPPORT SYSTEM

(71) Applicant: Phillip Douglas, Fredericktown, OH (US)

(72) Inventor: Phillip Douglas, Fredericktown, OH (US)

(*) Notice: Subject to any disclaimer, the term of this patent is extended or adjusted under 35 U.S.C. 154(b) by 0 days.

(21) Appl. No.: 14/545,885

(22) Filed: Jul. 1, 2015

(65) Prior Publication Data
US 2015/0307289 A1    Oct. 29, 2015

Related U.S. Application Data

(63) Continuation-in-part of application No. 13/999,396, filed on Feb. 21, 2014.

(60) Provisional application No. 61/850,770, filed on Feb. 23, 2013.

(51) Int. Cl.
| | |
|---|---|
| *B65G 53/60* | (2006.01) |
| *B65G 53/34* | (2006.01) |
| *F16M 13/02* | (2006.01) |
| *B65G 53/40* | (2006.01) |

(52) U.S. Cl.
CPC ............ *B65G 53/60* (2013.01); *B65G 53/34* (2013.01); *B65G 53/40* (2013.01); *F16M 13/02* (2013.01)

(58) Field of Classification Search
USPC .......... 406/163, 175, 179; 110/310; 111/175, 111/176; 414/299; 248/599, 601
See application file for complete search history.

(56) References Cited

U.S. PATENT DOCUMENTS

| | | |
|---|---|---|
| 521,619 A | 6/1894 | Jordan |
| 956,393 A | 4/1910 | Mechling |
| 1,380,698 A | 6/1921 | Anspach et al. |
| 1,671,706 A | 5/1928 | Evans |
| 1,861,295 A | 5/1932 | Bramwell |
| 2,003,159 A | 5/1935 | Taylor |
| 2,010,128 A | 8/1935 | Arnold |
| 2,127,035 A | 8/1938 | Kirlin |

(Continued)

FOREIGN PATENT DOCUMENTS

FR    1108436    1/1956

OTHER PUBLICATIONS

A. Bhatia, "Pneumatic Conveying Systems", Course No. M05-010, Continuing Education and Development, Inc., Stony Point, New York, pp. 1-57 esp. 16-18; no date.

(Continued)

*Primary Examiner* — Joseph Dillon, Jr.
(74) *Attorney, Agent, or Firm* — Andrew C. Pike

(57) ABSTRACT

A system supports an outlet, within a storage silo, of a pneumatic conveyor. The outlet comprises a horizontal section, a vertical section, and an elbow interconnecting the sections. The system comprises a vertical support for suspending and centering the outlet, and a horizontal support for selectively supporting the outlet upon the silo floor. The horizontal support has clamp assemblies mounted on the horizontal section, and sets of removable support legs respectively attachable to the clamp assemblies. The horizontal support also has elbow clamp assemblies adjacent the elbow, and an elbow brace and a subframe each interconnecting the elbow clamp assemblies. Each of the support legs has a locking pin for locking that leg in a deployed position, and a storing hole for placing that leg in a stored position. The system further comprises a deflector, and sets of stanchions therefor respectively attached to the clamp assemblies of the horizontal support.

27 Claims, 15 Drawing Sheets

(56) References Cited

U.S. PATENT DOCUMENTS

| | | | |
|---|---|---|---|
| 2,395,410 A * | 2/1946 | Kaesler | B65G 41/002 123/198 R |
| 2,643,161 A | 6/1953 | Shirk | |
| 2,695,197 A | 11/1954 | Burtis | |
| 2,697,640 A | 12/1954 | Newman | |
| 2,704,229 A | 3/1955 | Snow | |
| 2,767,031 A | 10/1956 | Huffman | |
| 2,875,968 A | 3/1959 | Ekola | |
| 2,942,820 A | 6/1960 | Sherburne | |
| 2,945,724 A * | 7/1960 | McClure | B01J 8/005 406/163 |
| 3,083,064 A | 3/1963 | McClure | |
| 3,099,891 A | 8/1963 | Handler | |
| 3,206,905 A * | 9/1965 | Wavering | C04B 20/06 248/206.5 |
| 3,675,796 A * | 7/1972 | Atkinson | A01F 25/186 406/167 |
| 3,854,637 A * | 12/1974 | Muller, Jr. | B65G 69/0441 222/564 |
| 4,005,016 A * | 1/1977 | Haese | B01D 33/0096 210/268 |
| 4,063,700 A * | 12/1977 | Brewer | F01N 13/1805 24/277 |
| 4,082,364 A | 4/1978 | Krambrock | |
| 4,097,243 A * | 6/1978 | Bartholic | B01J 8/0278 208/113 |
| 4,204,595 A | 5/1980 | Marrs | |
| 4,240,772 A * | 12/1980 | Wyatt | B65G 25/08 198/369.1 |
| 4,270,724 A | 6/1981 | McMullen | |
| 4,413,939 A * | 11/1983 | Peris | B23B 13/12 198/747 |
| 4,478,517 A * | 10/1984 | Hoppe | B01F 5/243 222/459 |
| 4,591,075 A * | 5/1986 | Eriksson | B65D 88/72 222/195 |
| 4,603,769 A | 8/1986 | Bach et al. | |
| 4,703,911 A | 11/1987 | Rammell | |
| 4,823,937 A | 4/1989 | Page | |
| 4,834,544 A | 5/1989 | Paul | |
| 4,978,227 A | 12/1990 | Paul | |
| 5,163,786 A | 11/1992 | Christianson | |
| 5,584,615 A | 12/1996 | Micklich | |
| 5,682,977 A | 11/1997 | White | |
| 6,227,357 B1 * | 5/2001 | Brown, Sr. | B25H 1/04 198/861.1 |
| 6,227,510 B1 | 5/2001 | McMullen, Sr. | |
| 6,632,063 B1 | 10/2003 | Karlsen et al. | |
| 8,770,537 B2 * | 7/2014 | Go | E02F 9/2275 212/347 |
| 8,821,078 B2 * | 9/2014 | Hockett | B65G 47/684 111/175 |
| 2003/0077128 A1 * | 4/2003 | Williams | B65G 53/16 406/173 |
| 2007/0228078 A1 | 10/2007 | Sanders | |
| 2014/0124339 A1 * | 5/2014 | Murphy | B02C 21/026 198/861.1 |
| 2014/0341698 A1 * | 11/2014 | Franco | F16M 11/24 414/800 |

OTHER PUBLICATIONS

Brock® brochure No. BR-2201/201404, Brock Grain Systems, Milford, Indiana, pp. 1-8 esp. 7; 2014.
Brock® brochure No. BR-2120/0210, Brock Grain Systems, Milford, Indiana, 1 sheet, 6 pages; no date.
Brock® brochure No. BR-2112/201307, Brock Grain Systems, Milford, Indiana, 1 sheet, 4 pages; 2013.
Push-Pac® Systems brochure, Christianson Systems, Inc., Blomkest, Minnesota, 1 sheet, 1 page; 2012.
Push-Pac® Systems brochure, Christianson Systems, Inc., Blomkest, Minnesota, 1 sheet, 2 pages; 2014.
Sukup® brochure No. L1189-052014, Sukup Manufacturing Co., Sheffield, Iowa, 1 sheet, 4 pages; 2014.

* cited by examiner

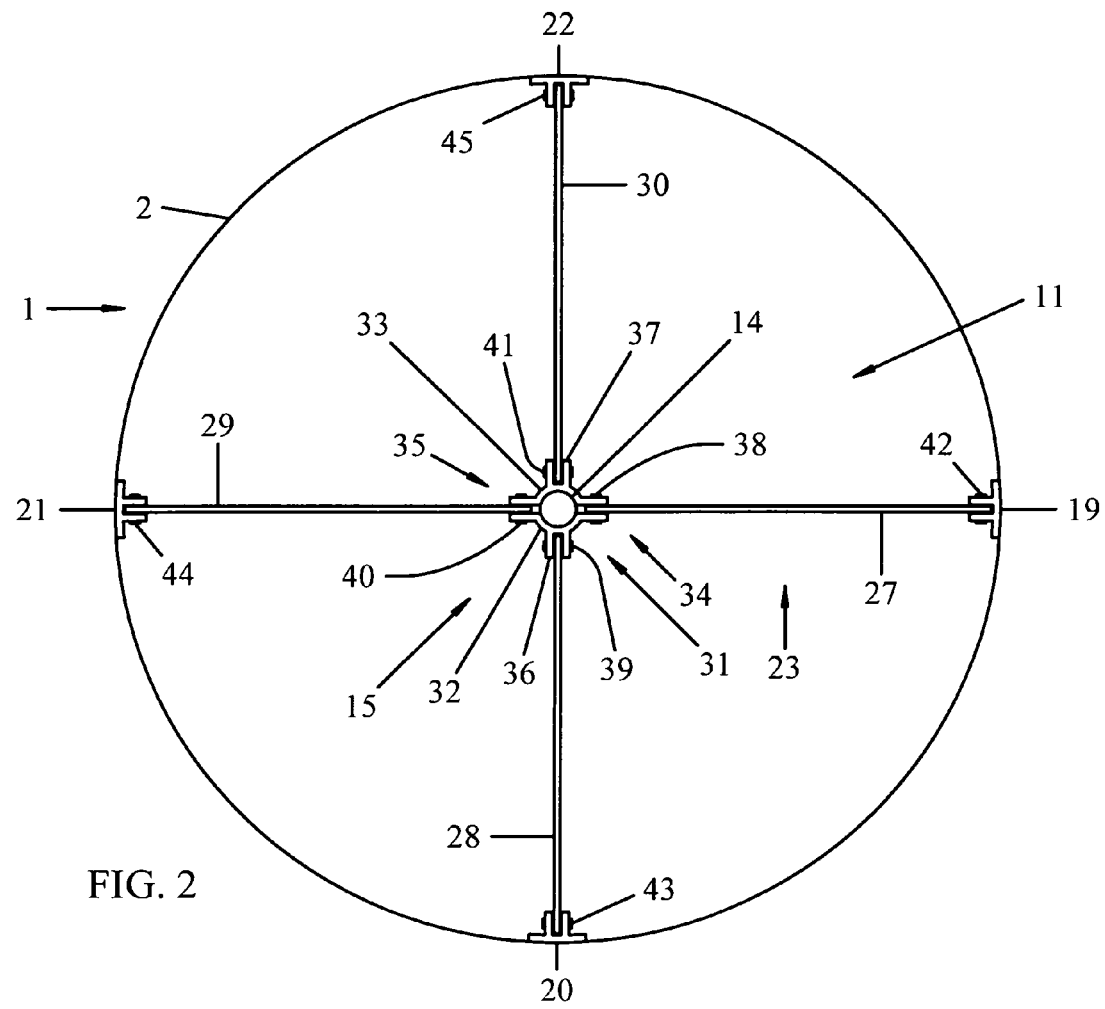
FIG. 2
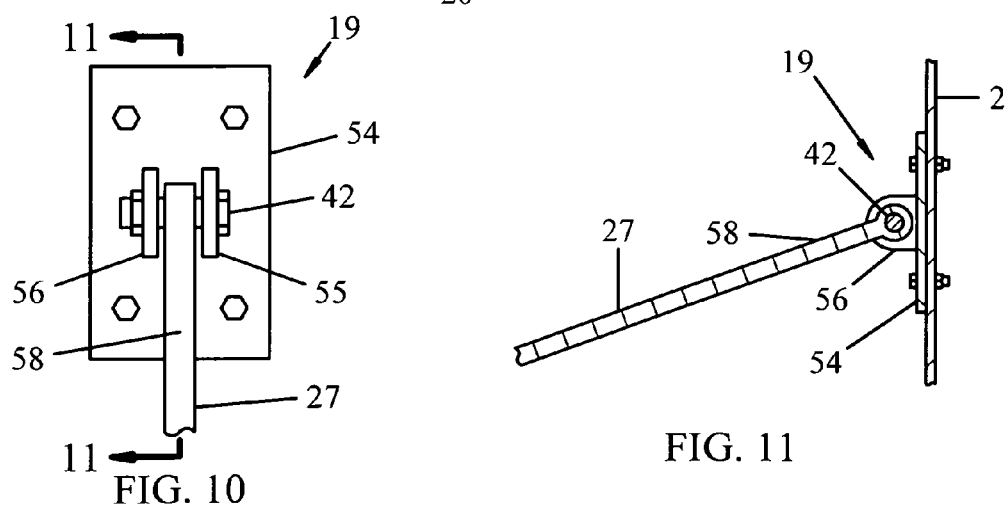
FIG. 10
FIG. 11

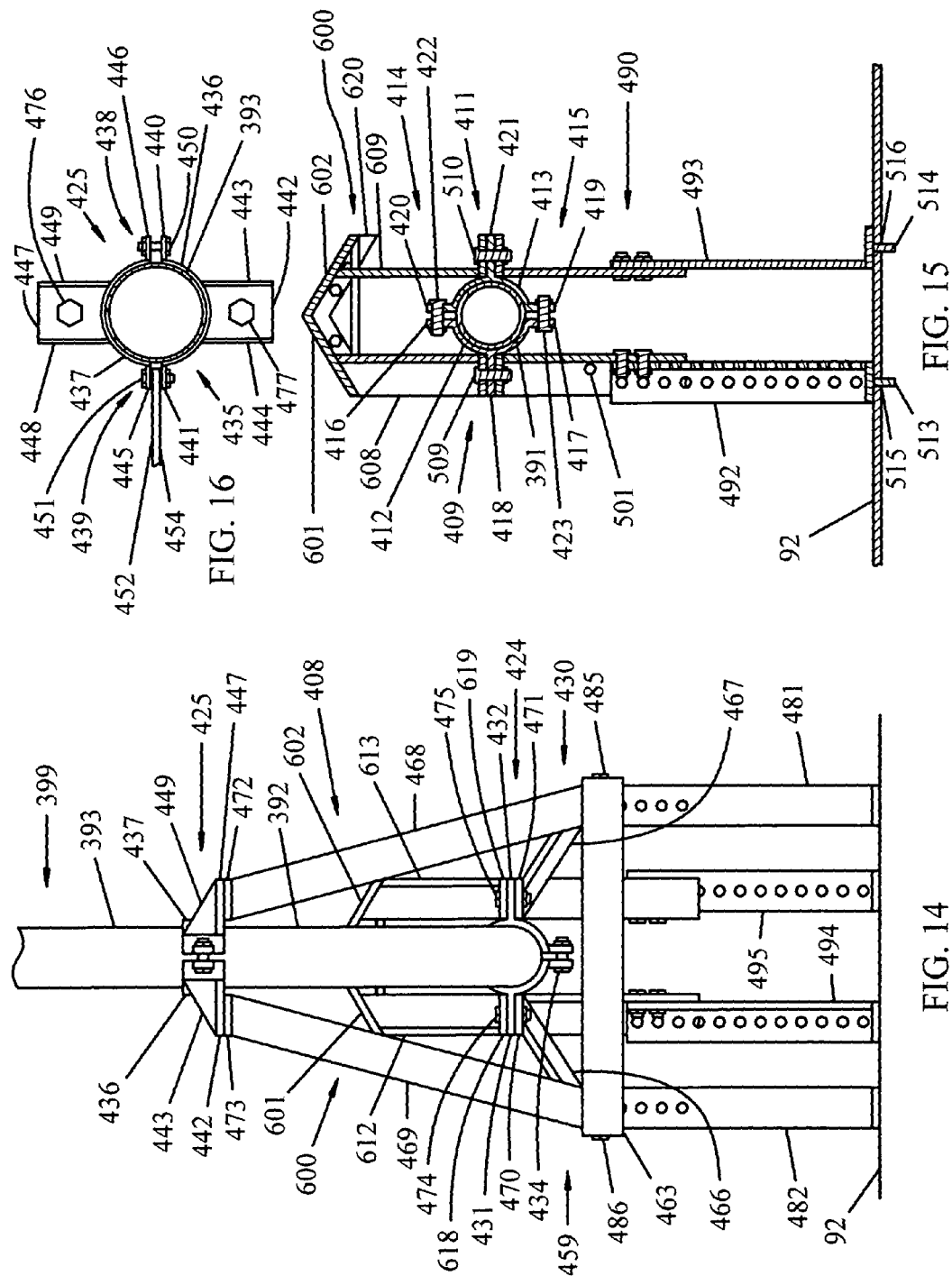

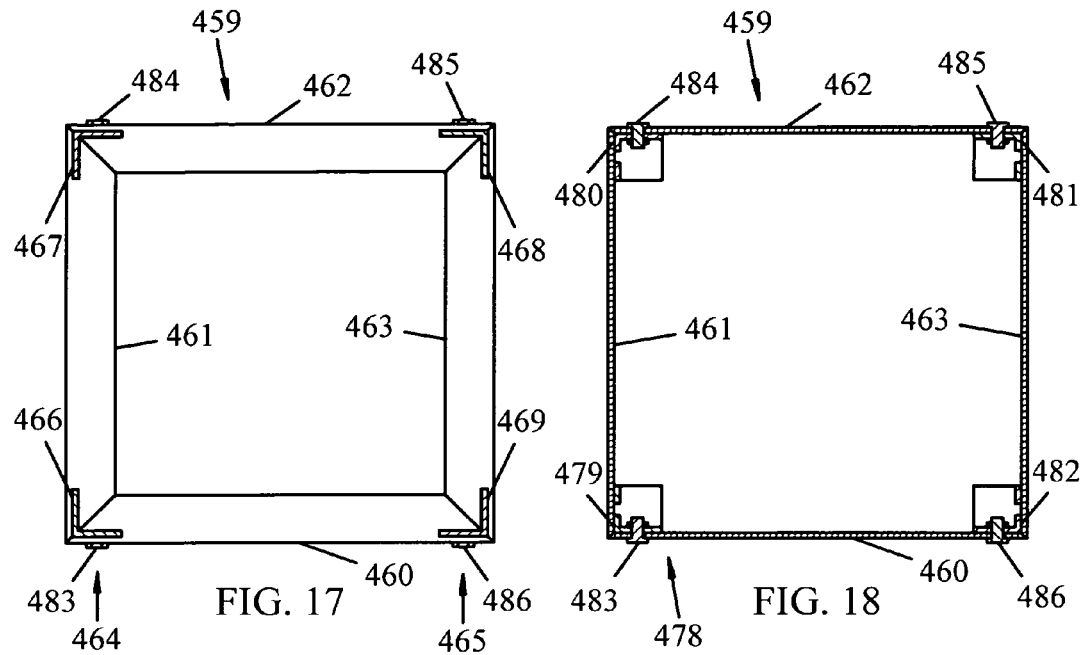
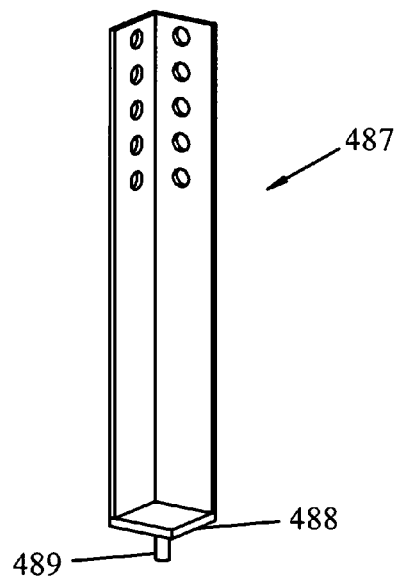
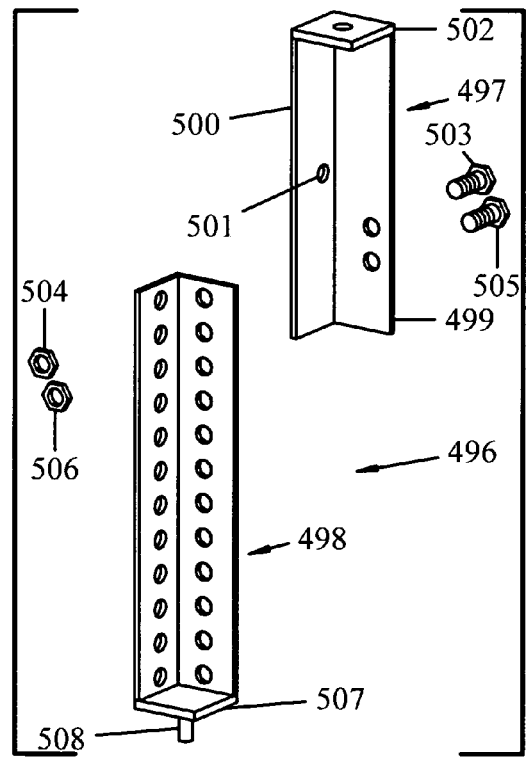
FIG. 17  FIG. 18  FIG. 19  FIG. 20

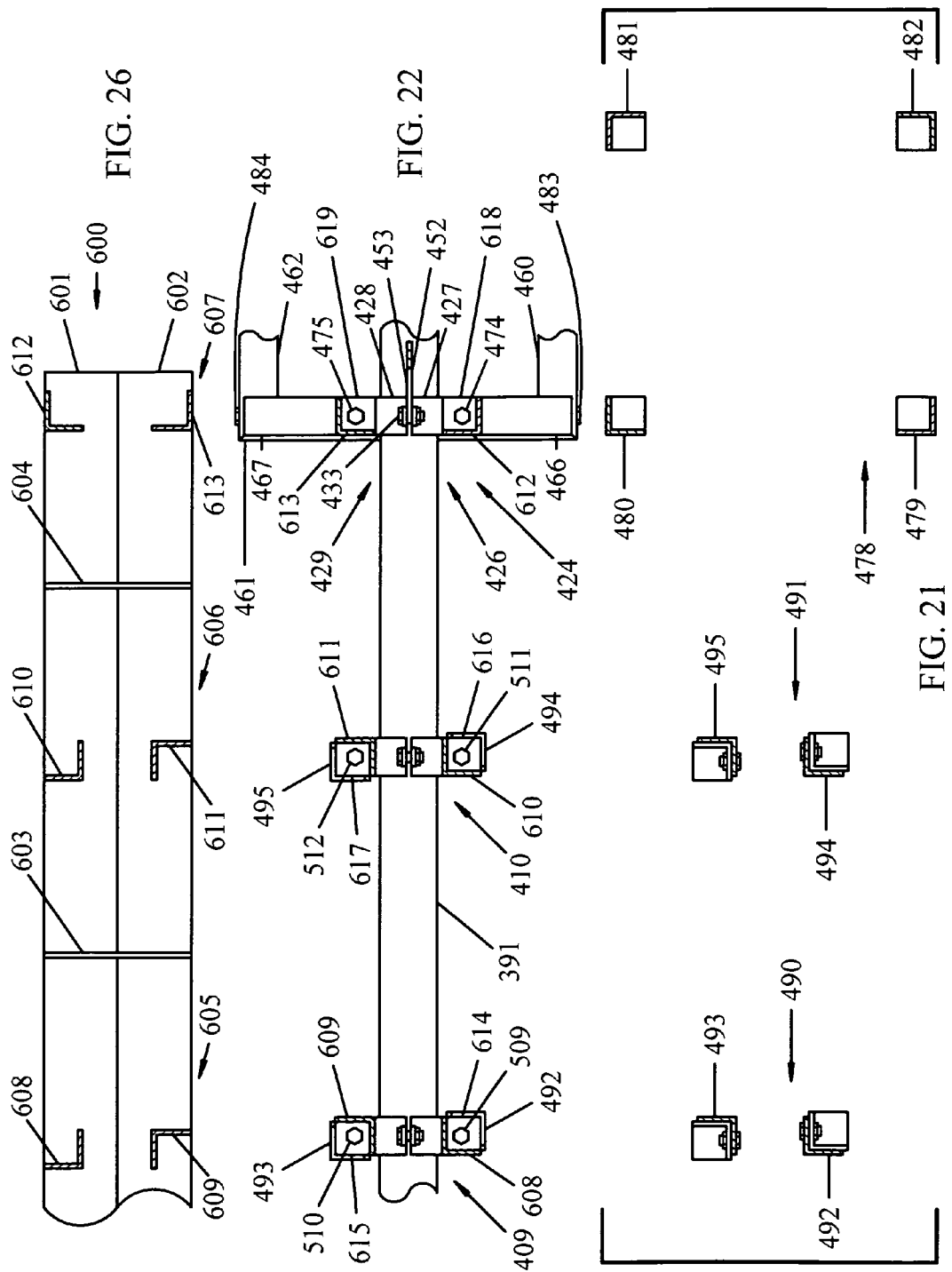

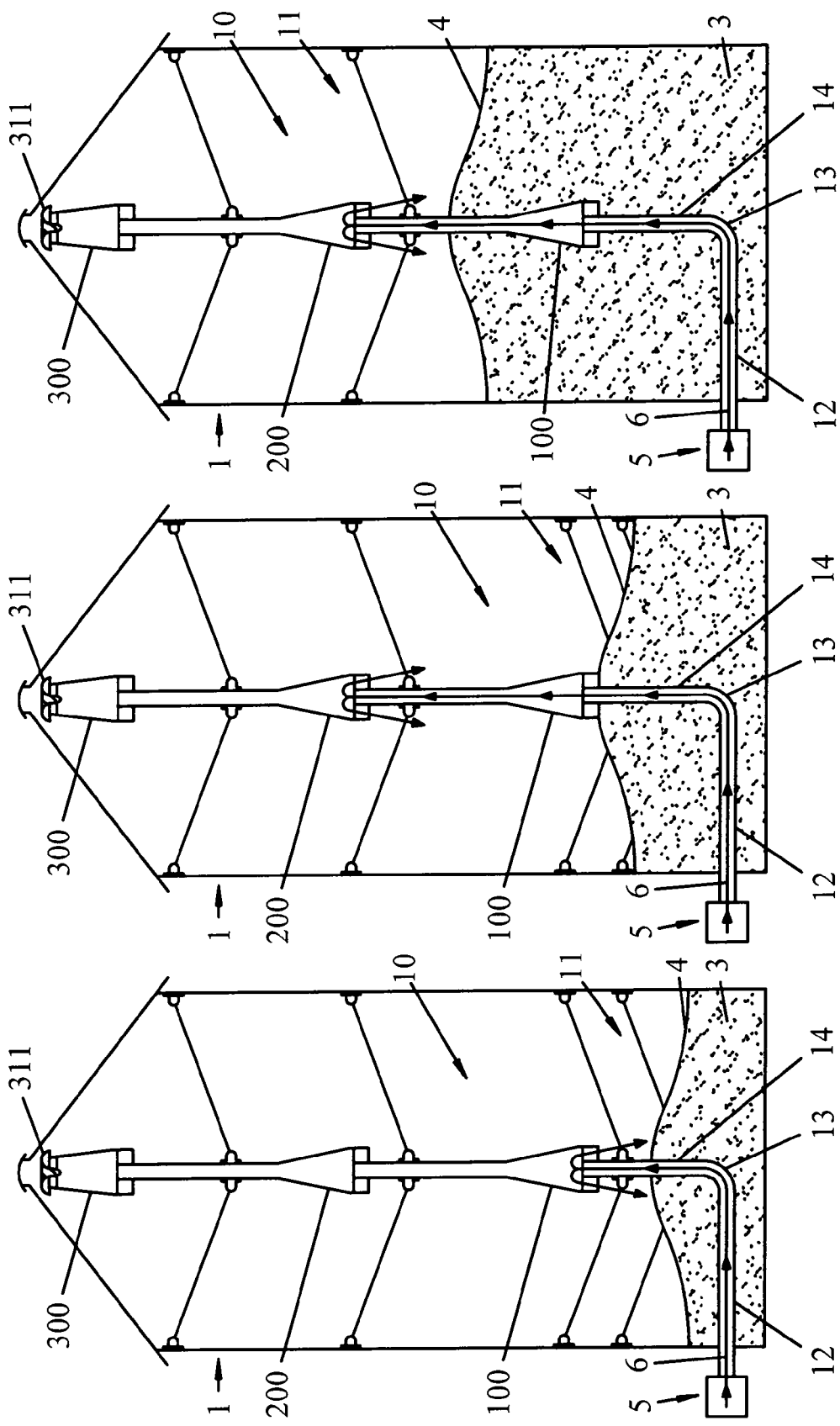

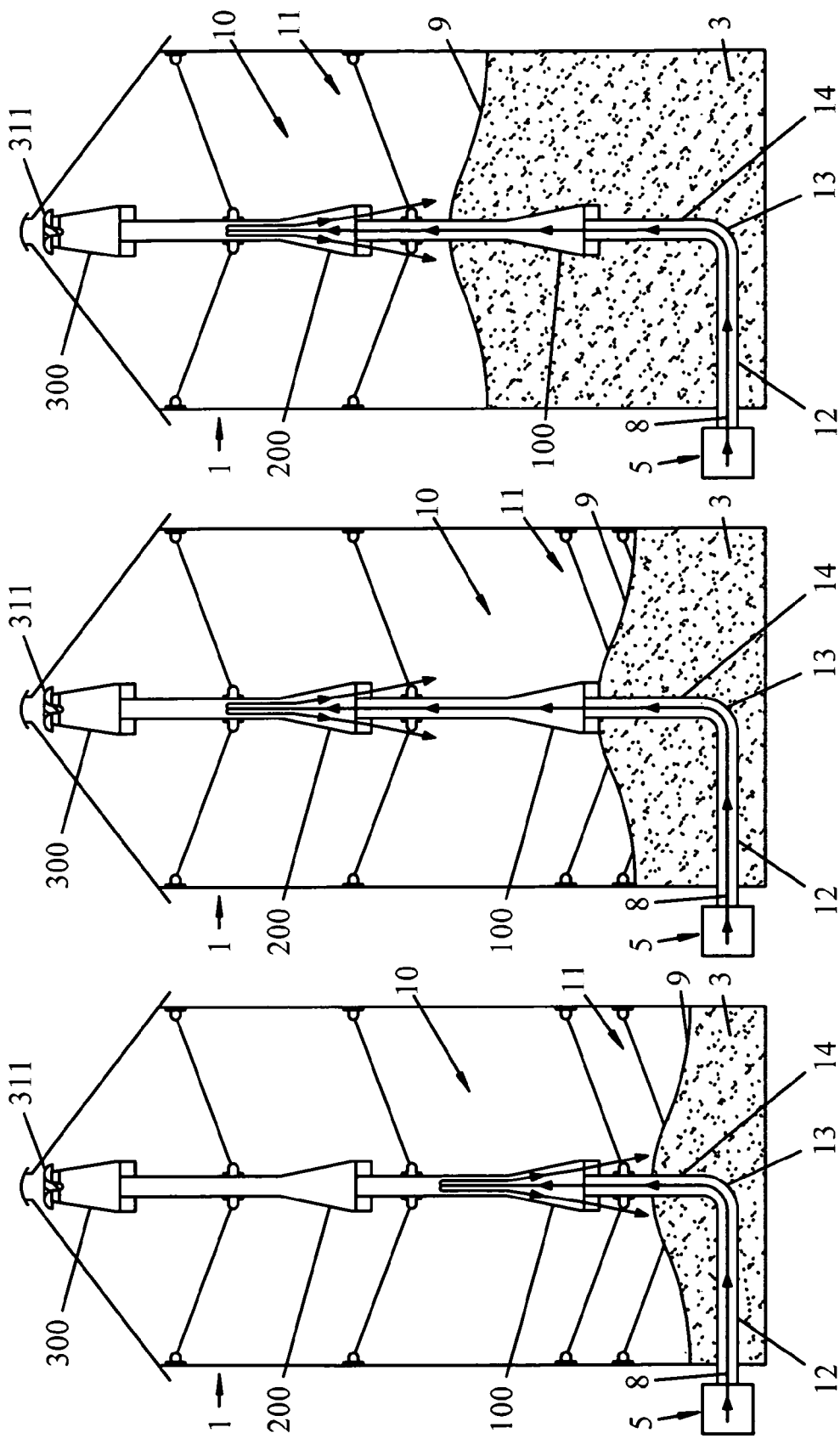

HORIZONTAL SUPPORT SYSTEM

CROSS-REFERENCE TO RELATED APPLICATIONS

This application is a continuation-in-part of application Ser. No. 13/999,396 filed Feb. 21, 2014, which claims the benefit of provisional application No. 61/850,770 filed Feb. 23, 2013, both of which are incorporated by reference.

BACKGROUND OF THE INVENTION

Field of the Invention

The present invention relates to the delivery of material being transported by a conveyor entraining the material within a flow of fluid, and in particular to the depositing of granular material by a pneumatic conveyor into a storage silo; and further relates to the support of the system for delivery of the material being so conveyed.

Background Art

Fluid flow conveyors, particularly pneumatic conveyor systems, have become a popular alternative to augers and belt conveyors for the movement of granular materials. Pneumatic conveyor systems are especially suitable for farm grains for the following reasons: grain is carried within a stream of air for less grain damage; a pneumatic conveyor is more economical to install; a pneumatic conveyor is more versatile for multiple silos and multiple silo types at a storage facility; pneumatic conveyors are sealed against water and pest infiltration between receiving point to delivery of the grain; one pneumatic conveyor system can be utilized to move a variety of grain types without cross contamination, simply by turning a valve distributor between silos; and pneumatic conveyor systems are easier to maintain.

Prior art pneumatic conveyor systems delivering grain to the top of storage silos introduce problems for these systems: a cyclone separator is required for the top of each silo; the entire system is exterior of the silo, exposing the machinery to weather-related damage; exterior supports that may be expensive must be used to support the pneumatic conveyor tubing; roof-mounted supports for the pneumatic conveyor and separator exert forces that tend to pull down the silo and collapse it; much of the pneumatic conveyor system is high above ground and not easily serviced; grain-to-grain damage occurs due to the falling of grain from the silo top to the bottom of the silo, which only increases with the height of the silo; and mixed granular materials experience product separation when dropped from the top of a silo.

Furthermore, an efficiency loss of approximately ten percent for every twenty-five feet (seven and one-half meters) of vertical rise is common to all pneumatic conveyor systems. For example, a pneumatic conveyor system used to fill a silo one hundred feet (thirty meters) tall would operate at 40% less than full efficiency (100 ft×(10%/25 ft)=40% loss; 30 m×(10%/7.5 m)=40% loss).

U.S. Pat. No. 4,082,364, Apr. 4, 1978, to Krambrock describes a method for sequentially filling a series of receiving stations from the tops thereof using a pneumatic conveyor, wherein each station is filled until the surface of the deposited material therewithin is just below the inlet thereof from the pneumatic conveyor and then this surface acts as a deflecting surface to direct the airflow entraining the material onto the next station.

U.S. Pat. No. 1,380,698, Jun. 7, 1921, to Anspach et al. discloses a multistage cyclone separator for a pneumatic conveyor depositing separated material to the same destination, wherein the multistage cyclone separator has at least a lower, upstream cyclone separator and an upper, downstream cyclone separator, and wherein the cyclone separators each has a horizontal inlet aperture through which the air entraining the material horizontally enters therewithin and a helical tube for continuously separating the material from the conveying air simultaneously in all of the cyclone separators.

U.S. Pat. No. 6,632,063, Oct. 14, 2003, to Karlsen et al. describes a system for reducing material segregation between finer and coarser material during filling of a silo from its top by controlling the entraining airflow to be a minimum, wherein the material within the silo as it is being filled can eventually reach the level of the outlet of the system for the material.

U.S. Pat. No. 4,603,769, Aug. 5, 1986, to Bach et al. describes a vertical chute for reducing grain dust with a series of vertically aligned outlets for filling a silo from its top, wherein the deposited grain blocks each outlet sequentially from lower to upper as the silo is filled.

The article *Pneumatic Conveying Systems*, course No. M05-010, no date, by A. Bhatia of Continuing Education and Development, Inc. discusses the present state of the art of pneumatic conveyors; and defines "choking" as the settling out downwardly of the entrained material from the entraining airflow when the airflow is flowing upwardly vertically in vertically oriented conveying piping, particularly before reaching the conveyor's destination and thus is to be avoided.

SUMMARY OF THE INVENTION

An objective of the present invention is to remove a major source of contamination into storage silos due to pneumatic conveyor systems by eliminating rooftop delivery of the material by the pneumatic conveyor.

Another objective is to reduce the expense of pneumatic conveyor systems by eliminating the components for rooftop delivery such as a cyclone separator and exterior supports for the pneumatic tubes.

Another objective is to increase the ease of maintenance of pneumatic conveyor systems by routing the pneumatic tubes connected to a storage silo near ground level.

Another objective is to protect the delivery system for a storage silo connected to a pneumatic conveyor from weather-related damage by locating and supporting the delivery system within the silo.

Another objective is to reduce grain-to-grain damage, and also product separation of mixed granular materials, by reducing the height through which the materials drop when deposited within a storage silo.

Another objective is to reinforce a storage silo against collapse due to the added weights and forces of the delivery system and the granular material when stored within the silo.

Another objective is to more evenly distribute the supported weight and forces of the delivery system for a storage silo and the granular material when stored within the silo, while also providing for an unobstructed floor area for mechanical or manual sweeping of the silo floor.

The delivery system of the present invention delivers material being transported by a conveyor entraining the material within a flow of fluid. The system comprises a tube for receiving the fluid flow entraining the material, separators for selectively separating the material from the fluid flow, and a support for vertically suspending the system within a storage silo. The tube, the separators, and the support are all within the silo.

Each separator functions selectively in either one of two modes of operation: either separating the material from the fluid flow, or else flowing the fluid flow entraining the material through the separator without separating. Each separator comprises an inlet, means for selectively separating the material from the fluid flow, an outlet for depositing the material from the selectively separating means, an outlet tube, a wall, and a through aperture between the wall and the outlet tube. For each separator, the separator, the inlet, the outlet, the through aperture, and the outlet tube are coaxial.

The selectively separating means comprises means for choking the fluid flow entraining the material within the separator thereof, and means for selectively flowing the separated material through the outlet thereof. The choking means comprises the receiving tube and the separator being vertically oriented with the outlet tube thereof being above the inlet and the outlet thereof. In one embodiment to be used with a relatively lower pressure of the fluid, the choking occurs within a generally conical volume within the separator between the inlet and the outlet tube thereof. In another embodiment to be used with a relatively higher pressure of the fluid, the choking occurs within a generally cylindrical volume within the separator within the outlet tube thereof.

The selectively separating means selectively separates the material from the fluid flow within the separator thereof only when the selectively flowing means is selectively flowing the material through the outlet thereof, depositing the separated material into the silo, creating a mound of the separated material having a surface. The material selectively flows through the outlet until the mound surface blocks the outlet thereof, stopping the selectively flowing and thus stopping the selectively separating of the separator thereof automatically. The fluid flow entraining the material is thus reestablished to go through the separator without separating the material.

The support suspends the system vertically within the silo from bottom to top, wherein the next separator that is downstream is located above the preceding separator that is upstream thereof, respectively. The support has a vertical support that suspends and centers the system within the silo, and a horizontal support that selectively supports the system upon the silo floor. The vertical support comprises clamp assemblies, a set of braces for each respective clamp assembly, and wall brackets connected to the respective braces for connecting to a wall of the storage silo, reinforcing the silo wall within the silo against collapse. Each clamp assembly comprises two equal halves each having two ends and an outer side, a flange for each end wherein the flanges of adjacent ends form end brackets, at least one bracket for each side, and connectors connecting the brackets to the braces, respectively. The horizontal support comprises clamp assemblies mounted on the horizontal section of the system, elbow clamp assemblies mounted adjacent the elbow of the system, a subframe and an elbow brace interconnecting the elbow clamp assemblies, and removable support legs attachable to the horizontal support in either deployed positions or stored positions. Means removably store the support legs in the stored positions on either the elbow brace or on the clamp assemblies mounted on the horizontal section. The support further has means, for providing the silo floor to be unobstructed by the support legs when they are removed from the deployed positions thereof, comprising fasteners for the support legs removably attaching them, when in the deployed positions thereof, to the clamp assemblies of the horizontal support.

A deflector of the present invention protects the horizontal section of the system from damage that may occur due to the material within the silo. Stanchions connect the deflector with the clamp assemblies of the horizontal support.

One method of the present invention comprises flowing the fluid flow entraining the material into a separator, selectively separating the material from the fluid flow within the separator within the outlet tube thereof, and depositing the selectively separated material out of the separator. The selectively separating comprises choking the fluid flow entraining the material within the separator within the outlet tube thereof. The depositing forms a mound of the material. The method further comprises stopping the selectively separating and the depositing, reestablishing the fluid flow entraining the material through the separator, flowing the fluid flow entraining the material into a downstream separator that is downstream of the separator, selectively separating the material from the fluid flow within the downstream separator, and depositing that selectively separated material out of the downstream separator onto the mound of the material.

Thus, the present invention automatically sequentially fills a storage silo as initially an upstream separator selectively separates the material onto the mound of separated material that is being formed within the silo until the surface of the mound blocks the outlet thereof and stops the selectively separating of that upstream separator, and then subsequently a separator that is downstream of that upstream separator selectively separates the material onto the mound, and so continues for all of the separators until the silo is filled.

The present invention reduces the average drop height of the separated material. This reduces grain-to-grain damage and also product separation of mixed granular materials. The reduction in average drop height of the separated material also increases the efficiency of the pneumatic conveyor system. Whereas a prior art pneumatic conveyor system having rooftop delivery of the material typically would have, for example, for a one-hundred-foot (thirty-meter) high silo a 40% loss of efficiency (as hereinbefore stated), the present invention with four separators bottom to top for the same silo would have a calculated loss of only 25% ((10%+20%+30%+40%)/4)=25%). This is an increase of delivery efficiency by fifteen percentage points, or 25% (((100%−25%)−(100%−40%))/(100%−40%)=125%).

An additional advantage of the present invention over the prior art is the simplicity of operation, with the separators acting automatically and with no moving parts being required for the delivery system.

Another method of the present invention, when the silo is equipped with a bin sweep having bumpers, is for removing the material from the silo, and comprises extracting the material until one of the support legs is accessible out of the material, and then removing that leg from the deployed position thereof and placing that leg in the stored position thereof. The bin sweep is subsequently operated to continue to extract more of the material until one of the bumpers bumps into another of the legs that is still mounted in the deployed position thereof, and then the bin sweep is stopped. This leg is likewise removed from the deployed position thereof and placed in the stored position thereof. This sequence of operating the bin sweep until one of the bumpers bumps into another of the still-mounted support legs, stopping the bin sweep, and removing and placing that support leg in the stored position thereof continues until all of the support legs are in the stored positions thereof, providing an unobstructed silo floor. The bin sweep can then be operated to continue extracting more of the material from the silo.

BRIEF DESCRIPTION OF THE DRAWINGS

FIG. 2 is a schematic bottom view of the embodiment of the present invention, as shown in FIG. 1, showing one clamp assembly, and braces and wall brackets of the vertical support.

FIG. 10 is a front view, partly broken, of one embodiment of a wall bracket and a brace of the vertical support.

FIG. 11 is a cross-sectional view, partly broken, taken on line 11-11 in FIG. 10.

FIG. 14 is an end view of the embodiment of the present invention, as shown in FIG. 13, showing the horizontal support.

FIG. 15 is a cross-sectional view, partly broken, taken on the offset cross-sectional line 15-15 in FIG. 13 showing one clamp assembly and the support legs thereof of the horizontal support, and the deflector and one set of the stanchions thereof.

FIG. 16 is a cross-sectional view, partly broken, taken on line 16-16 in FIG. 13 showing the vertical elbow clamp assembly of the horizontal support.

FIG. 17 is a cross-sectional view taken on line 17-17 in FIG. 13 showing the subframe and the stanchions thereof of the horizontal support.

FIG. 18 is a cross-sectional view taken on line 18-18 in FIG. 13 showing the subframe and the support legs thereof of the horizontal support.

FIG. 19 is a perspective view of one embodiment of a support leg of the horizontal support as shown in FIG. 13.

FIG. 20 is a perspective, partially exploded, view of another embodiment of a support leg of the horizontal support as shown in FIG. 13.

FIG. 21 is a cross-sectional view taken on line 21-21 in FIG. 13 showing the support legs of the horizontal support.

FIG. 22 is a cross-sectional view, partly broken, taken on line 22-22 in FIG. 13 showing the stanchions of the horizontal support.

FIG. 26 is a cross-sectional view, partly broken, taken on line 26-26 in FIG. 13 showing the deflector and the stanchions thereof.

FIG. 28 is a schematic view of the embodiment of the present invention, as shown in FIG. 1, showing the upstream separator in one embodiment of operation, as shown in FIG. 27, separating the material from the airflow during the sequential filling of the silo.

FIG. 29 is a schematic view of the sequential filling of the silo, as shown in FIG. 28, showing the upstream separator stopping the separation thereof and reestablishing the flowing of the airflow entraining the material therethrough, without separating, onto the downstream separator for separating the material.

FIG. 30 is a schematic view of the sequential filling of the silo, as shown in FIG. 29, showing the downstream separator in one embodiment of operation, as shown in FIG. 27, separating the material from the airflow onto the material that had been separated by the upstream separator.

FIG. 32 is a schematic view of the embodiment of the present invention, as shown in FIG. 1, showing the upstream separator in another embodiment of operation, as shown in FIG. 31, separating the material from the airflow during the sequential filling of the silo.

FIG. 33 is a schematic view of the sequential filling of the silo, as shown in FIG. 32, showing the upstream separator stopping the separation thereof and reestablishing the flowing of the airflow entraining the material therethrough, without separating, onto the downstream separator for separating the material.

FIG. 34 is a schematic view of the sequential filling of the silo, as shown in FIG. 33, showing the downstream separator in another embodiment of operation, as shown in FIG. 31, separating the material from the airflow onto the material that had been separated by the upstream separator.

DETAILED DESCRIPTION OF THE INVENTION

Figure 1:
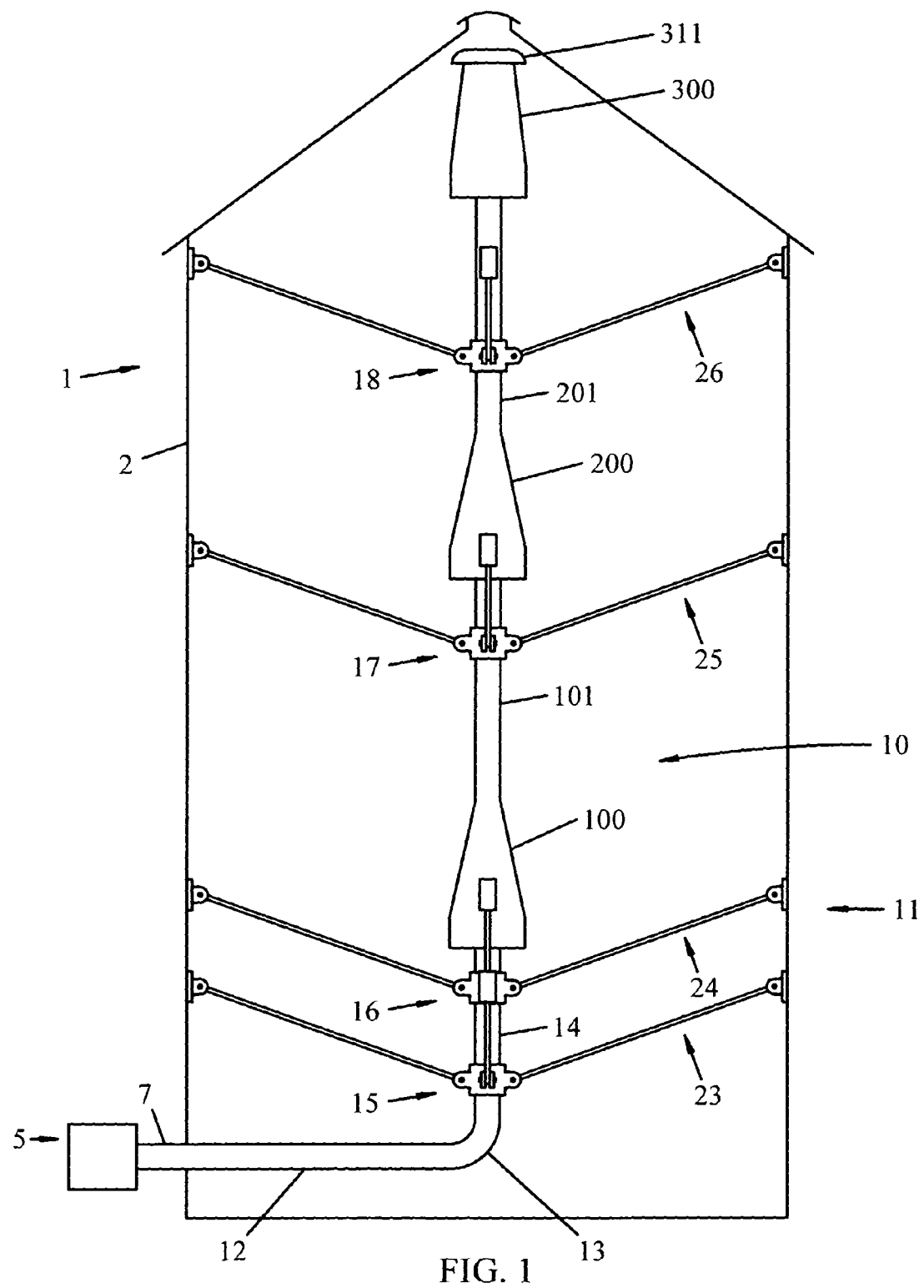
FIG. 1 is a schematic side view of one embodiment of the present invention supported within a storage silo comprising an upstream separator, a downstream separator, a top separator, and a vertical support comprising four clamp assemblies with braces and wall brackets.

The present invention is supported within a vertical storage silo 1 having a wall 2 as shown schematically in FIG. 1. The silo 1 is for the removable storage of granular material 3, for example grain, that, when so stored, has a material surface 4 as shown in FIG. 28, FIG. 29, and FIG. 30. Although the present invention is contemplated primarily for grain, the intent of the claimed invention is to be construed to include all manner of granular material. Pelletized food products, fuels, coal, animal feeds, plastics, and fiber products are a few of the other items suitable for pneumatic conveying for removable storage.

The present invention delivers the material 3 to the silo 1 when the material is transported by a conveyor entraining the material within a flow of fluid. One embodiment of the present invention is contemplated to be used with a conventional pneumatic conveyor system that entrains the material within a flow of air for depositing the material 3 into the silo 1.

A conventional pneumatic charging system is shown generally in FIG. 1 as pneumatic conveyor 5. Pneumatic conveyor 5 is known in the art. Typically, a blower (not shown) supplies a flow of air to a rotary airlock (not shown). The rotary airlock entrains the material 3 to be conveyed into the airflow creating a pneumatic material flow 6 that is a mixture of the airflow entraining the conveyed material to be propelled toward the silo 1. The pneumatic conveyor 5 connects to a tube 7 for conveying of the pneumatic material flow 6. The tube 7 is a pneumatic transfer tube known in the art.

The present invention comprises an outlet of the pneumatic conveyor 5. One embodiment of the present invention is shown schematically in FIG. 1 and FIG. 2 as, generally, a delivery system 10. The delivery system 10 comprises a series of tubes and separators within the silo 1. A vertical support 11 of the delivery system 10 suspends and centers the delivery system 10 within the silo 1, and reinforces the silo 1 against collapse. The tube 7 connects to a horizontal tube 12 of the delivery system 10 for conveying the pneumatic material flow 6 into the silo 1. The horizontal tube 12 may be slightly angled from being exactly horizontal, either upwardly or downwardly, to improve and maintain the pneumatic material flow 6 to provide maximum conveyance of the material. The horizontal tube 12 enters the silo 1 through a lower portion of the silo wall 2. An elbow 13 interconnects the horizontal tube 12 and a vertical tube 14 for conveying the pneumatic material flow 6 upwardly within the silo 1. Alternatively, the tube 7 could connect directly through the silo floor to either the elbow 13 or the vertical tube 14, in which case the horizontal tube 12 would not be included in the delivery system 10. The vertical tube 14 is located at and along the vertical center of the silo 1 as shown in FIG. 2. A clamp assembly 15 of the vertical support 11 is positioned on the vertical tube 14 near the elbow 13.

The vertical support 11 includes a plurality of clamp assemblies, and in particular, for the embodiment shown in FIG. 1, the clamp assembly 15 and also clamp assemblies 16, 17, and 18. As shown in FIG. 2, the vertical support 11 further includes wall brackets 19, 20, 21, and 22 on the silo wall 2, and a set 23 of braces 27, 28, 29, and 30 interconnecting the clamp assembly 15 with the wall brackets 19, 20, 21, and 22 on the silo wall 2, respectively, thereby suspending and centering the vertical tube 14 within the silo 1. Sets 24, 25, and 26 of braces also interconnect the clamp assemblies 16, 17, and 18, respectively, with wall brackets. The silo wall 2 is thus interconnected throughout and within the silo 1 by the vertical support 11, specifically, for the embodiment shown in FIG. 1 and FIG. 2, the clamp assemblies 15, 16, 17, and 18, the sets 23, 24, 25, and 26 of the braces, and the respective wall brackets therefor, simultaneously reinforcing the silo wall 2 against collapse of the silo 1 as well as supporting the delivery system 10.

The clamp assembly 15 includes a clamp 31. As shown schematically in FIG. 2, clamp 31 has two equal half clamps 32 and 33 mounted on and clamping around the vertical tube 14. The clamp 31 has end brackets 34 and 35, each at adjacent ends of the half clamps 32 and 33, and one or more side brackets 36 and 37 on each side of the half clamps 32 and 33.

The braces 27, 28, 29, and 30 are evenly spaced around the vertical tube 14; and are connected at one end thereof to the end bracket 34, the side bracket 36, the end bracket 35, and the side bracket 37, respectively, by fasteners or bolts 38, 39, 40, and 41, respectively, as connectors and are secured, as by nuts when bolts are used. The wall brackets 19, 20, 21, and 22 are evenly spaced on, and connected to, the inner surface of the silo wall 2 on a horizontal plane above the height of the clamp assembly 15. Opposite ends of the braces 27, 28, 29, and 30 are connected to the wall brackets 19, 20, 21, and 22, respectively, by fasteners or bolts 42, 43, 44, and 45, respectively, and are secured, as by nuts when bolts are used, thereby equally connecting the brackets of the clamp 31 to the silo wall 2. The braces 27, 28, 29, and 30 each has a length equal to or greater than the radius of the silo 1, and extend radially upwardly and outwardly from the clamp assembly 15 to the wall brackets 19, 20, 21, and 22.

The vertical tube 14 is connected to an upstream separator 100 of the delivery system 10 by slipping into the upstream separator 100. The clamp assembly 16 of the vertical support 11 is positioned, in the embodiment shown in FIG. 1, on the vertical tube 14 near the upstream separator 100 for suspending and centering the vertical tube 14 within the silo 1. The upstream separator 100 comprises a vertical tube 101 for conveying the pneumatic material flow 6 upwardly from the upstream separator 100. The upstream separator 100 selectively either separates the material from the airflow and deposits the separated material 3 into the silo 1; or else flows the pneumatic material flow 6 through the upstream separator 100, without separating the material from the airflow, and into the vertical tube 101.

In the embodiment shown in FIG. 1, the vertical tube 101 is connected to a downstream separator 200 of the delivery system 10 by slipping into the downstream separator 200. The downstream separator 200 is vertically above the upstream separator 100 and downstream of the upstream separator 100. The clamp assembly 17 of the vertical support 11 is positioned on the vertical tube 101 near the downstream separator 200 for suspending and centering the vertical tube 101 and the upstream separator 100 within the silo 1. The downstream separator 200 comprises a vertical tube 201 for conveying the pneumatic material flow 6 upwardly from the downstream separator 200. The downstream separator 200 selectively either separates the material from the airflow and deposits the separated material 3 into the silo 1 onto the separated material 3 deposited by the upstream separator 100; or else flows the pneumatic material flow 6 through the downstream separator 200, without separating the material from the airflow, and into the vertical tube 201.

The vertical tube 201, in the embodiment shown in FIG. 1, connects to a top separator 300 of the delivery system 10 that is vertically above both the upstream separator 100 and the downstream separator 200 and that is downstream of the downstream separator 200. The clamp assembly 18 of the vertical support 11 is positioned on the vertical tube 201 for suspending and centering the vertical tube 201 and the downstream separator 200 within the silo 1. The top separator 300 comprises an open cap 311 on the top of the top separator 300. The top separator 300 selectively either separates the material from the airflow and deposits the separated material 3 into the silo 1 onto the separated material 3 deposited by both the upstream separator 100 and the downstream separator 200; or else flows the pneumatic material flow 6 through the top separator 300, without separating the material from the airflow, toward the cap 311.

Figure 3:
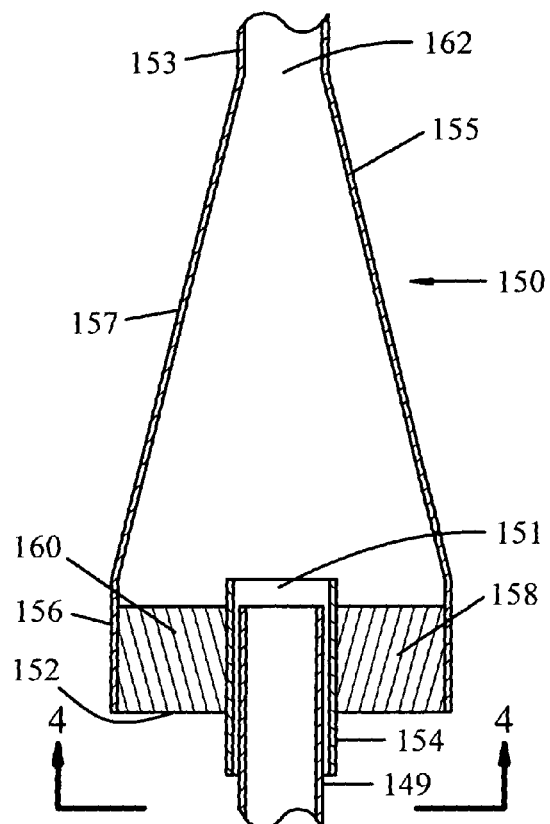
FIG. 3 is a cross-sectional view, partly broken, taken on line 3-3 in FIG. 4 of one embodiment of a separator that is not a top separator.
Figure 4:
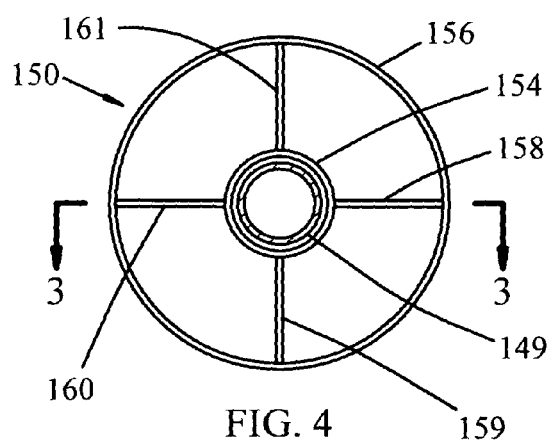
FIG. 4 is a cross-sectional view taken on line 4-4 in FIG. 3.

One embodiment of a material separator 150 of the present invention that is not a top separator, that, for the embodiment shown in FIG. 1, can be any separator of the delivery system 10 that is not the top separator 300, is shown in FIG. 3 and FIG. 4. A vertical tube 149 conveys the pneumatic material flow 6 upwardly, from upstream of the material separator 150, downstream into the material separator 150. For the embodiment shown in FIG. 1, the vertical tube 149 can be any of the vertical tube 14 or the vertical tube that any of the separators of the delivery system 10, that is not the top separator 300, comprises.

The material separator 150 has an inlet 151, an outlet 152 below the inlet 151, and a cylindrical outlet tube 153 above the inlet 151. The outlet tube 153 is generally cylindrical in its entirety, and has the same outside diameter as the outside diameter of the vertical tube 149. For the embodiment shown in FIG. 1, the outlet tube 153 can be any of the vertical tube that any of the separators of the delivery system 10, that is not the top separator 300, comprises.

The material separator 150 includes an inlet tube 154 forming the inlet 151 at the upper end of the inlet tube 154. The lower end of the inlet tube 154 is below the outlet 152. The inside diameter of the inlet tube 154 is greater than the outside diameter of the vertical tube 149. The vertical tube 149 thus slips into the inlet tube 154 of the material separator 150.

The material separator 150 has a metal wall 155 that interconnects the outlet 152 and the outlet tube 153. The wall 155 forms a cylindrical base 156 and a forcing cone 157 above the cylindrical base 156. The inside diameter of the cylindrical base 156 is greater than the outside diameter of the inlet tube 154, forming the outlet 152 at the lower end of the cylindrical base 156. A plurality of webs 158, 159, 160, and 161 structurally interconnect and space apart the cylindrical base 156 and the inlet tube 154, thus together with the inlet tube 154 and the wall 155 interconnecting together the inlet 151, the outlet 152, and the outlet tube 153. The forcing cone 157 tapers upwardly and inwardly to the outlet tube 153, forming a through aperture 162 between the forcing cone 157 and the outlet tube 153. The inlet 151, the outlet 152, the inlet tube 154, the cylindrical base 156, essentially the entire forcing cone 157, and the webs 158, 159, 160, and 161 are all vertically below the through aperture 162 on the proximal side of the through aperture 162. Essentially the entire outlet tube 153 is vertically above the through aperture 162 on the distal side of the through aperture 162.

The material separator 150, the inlet 151, the outlet 152, the through aperture 162, the outlet tube 153, and the inlet tube 154 are coaxial. The relative sizes of the material separator 150 may be different based upon which specific granular material 3 is primarily to be delivered to the silo 1. For example, for grain, in the embodiment of the material separator 150 as shown in FIG. 3 and FIG. 4, the cylindrical base 156 has an inside diameter about three times the outside diameter of the inlet tube 154, and the axial distance between the outlet 152 and the through aperture 162 is approximately six times the diameter of the inlet 151.

Figure 5:
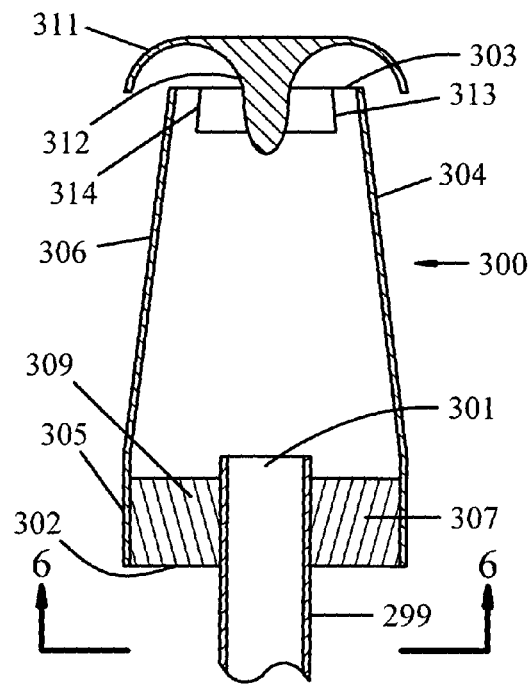
FIG. 5 is a cross-sectional view, partly broken, taken on line 5-5 in FIG. 6 of one embodiment of a top separator.
Figure 6:
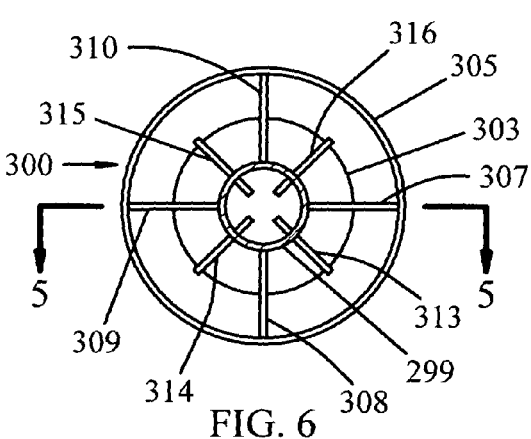
FIG. 6 is a cross-sectional view taken on line 6-6 in FIG. 5.

One embodiment of the top separator 300 of the present invention is shown in FIG. 5 and FIG. 6. A vertical tube 299 conveys the pneumatic material flow 6 upwardly, from upstream of the top separator 300, downstream into the top separator 300. The vertical tube 299 shown in FIG. 5 and FIG. 6 conveys the pneumatic material flow 6 from the uppermost material separator 150 of the delivery system 10 that is not the top separator 300. For the embodiment shown in FIG. 1, the vertical tube 299 shown in FIG. 5 and FIG. 6 is the vertical tube 201 shown in FIG. 1 that the downstream separator 200 (which is the uppermost separator that is not the top separator 300) of the delivery system 10 comprises.

The top separator 300 has an inlet 301, a first outlet 302 below the inlet 301, and a second outlet 303 above the inlet 301. The vertical tube 299 extends into and terminates within the top separator 300 forming the inlet 301 at the upper end of the vertical tube 299.

The top separator 300 has a metal wall 304 that interconnects the first outlet 302 and the second outlet 303. The wall 304 forms a cylindrical base 305 and a cone 306 above the cylindrical base 305. The inside diameter of the cylindrical base 305 is greater than the outside diameter of the vertical tube 299, forming the first outlet 302 at the lower end of the cylindrical base 305. A plurality of webs 307, 308, 309, and 310 structurally interconnect and space apart the cylindrical base 305 and the vertical tube 299, thus together with the vertical tube 299 and the wall 304 interconnecting together the inlet 301, the first outlet 302, and the second outlet 303. The cone 306 tapers upwardly and inwardly to a diameter about two times the diameter of the inlet 301 at the second outlet 303.

An open cap 311 is at the second outlet 303 and has a stem 312. A plurality of webs 313, 314, 315, and 316 interconnect and space apart the stem 312 and the cone 306 at the second outlet 303, centering the stem 312 into the second outlet 303. The open cap 311 is mushroom shaped, blocking continued vertical flow, and redirects any flow through the second outlet 303 downwardly and out of the top separator 300.

The top separator 300, the inlet 301, the first outlet 302, and the second outlet 303 are coaxial. The relative sizes of the top separator 300 may be different based upon which specific granular material 3 is primarily to be delivered to the silo 1. For example, for grain, in the embodiment of the top separator 300 as shown in FIG. 5 and FIG. 6, the cylindrical base 305 has an inside diameter about three times the outside diameter of the vertical tube 299. The overall height of the top separator 300 is about six times the diameter of the inlet 301.

Figure 7:
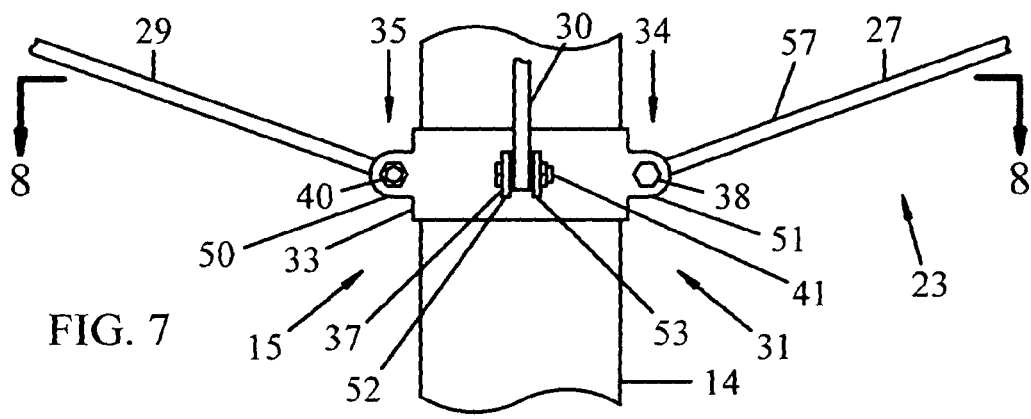
FIG. 7 is a side view, partly broken, of one embodiment of a clamp assembly and braces of the vertical support.

The clamp assemblies of the vertical support 11 are identical with each other; and, as such, the clamp assembly 15 is typical. The clamp assembly 15 is shown in greater detail in FIG. 7, FIG. 8, and FIG. 9.

The clamp 31 of the clamp assembly 15 has an inside circumference less than the outside circumference of the vertical tube 14. The clamp 31 is composed of metal plate or metal casting. The clamp 31 is a union of the two equal half clamps 32 and 33.

The half clamp 32 has an outwardly radiating end flange 46 on one end for forming the end bracket 34, and an outwardly radiating end flange 47 on the other end for forming the end bracket 35. The half clamp 32 has one or more of the side brackets 36 evenly spaced between the ends of the half clamp 32. Each side bracket 36 has two flanges 48 and 49 closely spaced to, and parallel with, each other. Each side bracket 36 has one aligning through hole formed by aligned holes in the flanges 48 and 49 thereof.

The half clamp 33 has an outwardly radiating end flange 50 on one end for forming the end bracket 35, and an outwardly radiating end flange 51 on the other end for forming the end bracket 34. The half clamp 33 has one or more of the side brackets 37 evenly spaced between the ends of the half clamp 33. Each side bracket 37 has two flanges 52 and 53 closely spaced to, and parallel with, each other. Each side bracket 37 has one aligning through hole formed by aligned holes in the flanges 52 and 53 thereof.

Figure 8:
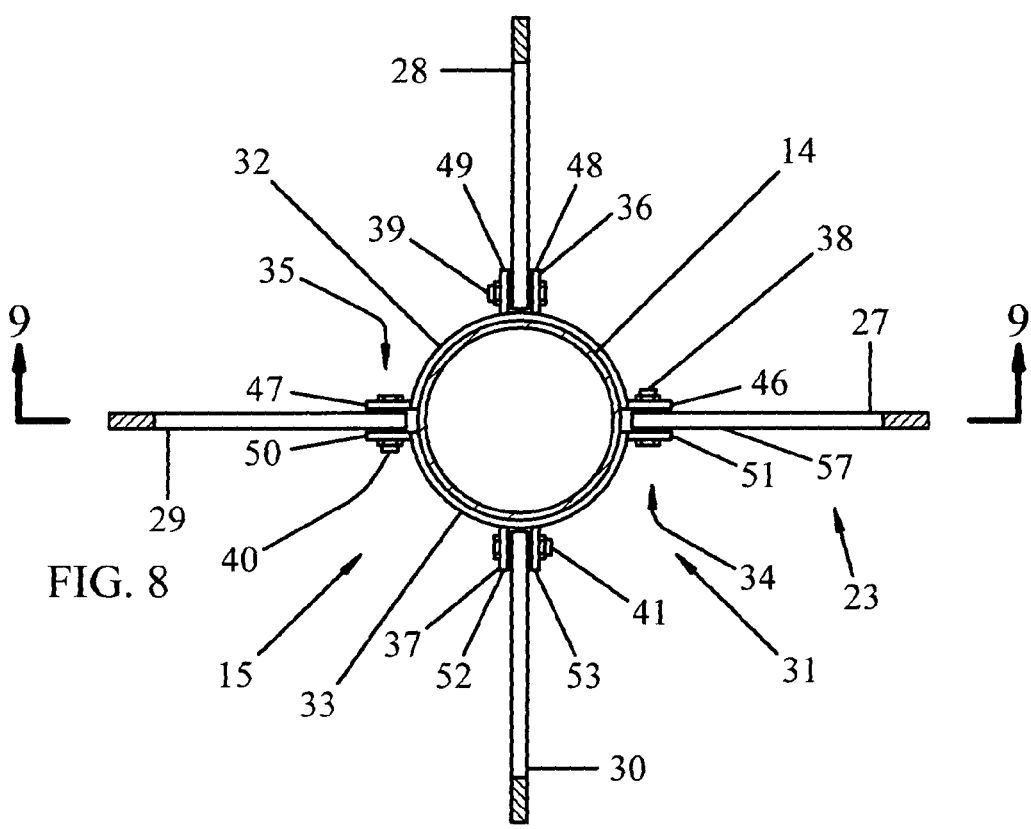
FIG. 8 is a cross-sectional view taken on line 8-8 in FIG. 7.
Figure 9:
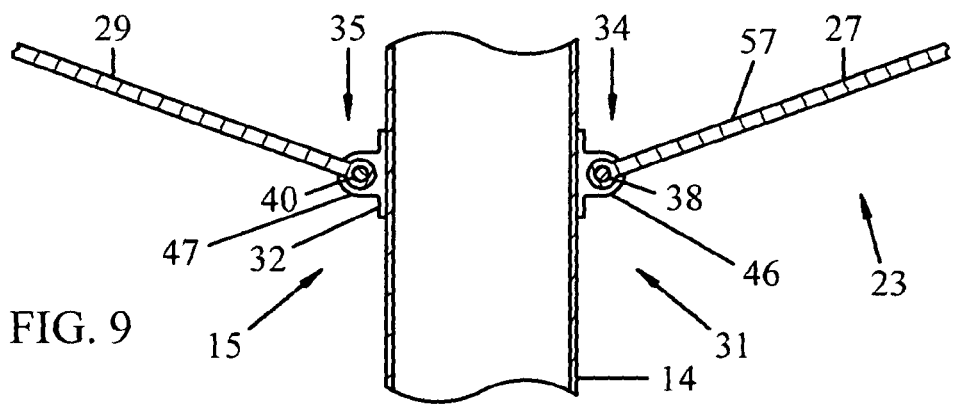
FIG. 9 is a cross-sectional view, partly broken, taken on line 9-9 in FIG. 8.

When the half clamps 32 and 33 are mounted onto the vertical tube 14, as shown in FIG. 8, the end flange 46 of the half clamp 32 and the end flange 51 of the half clamp 33 are adjacent to each other, forming the end bracket 34; and the end flange 47 of the half clamp 32 and the end flange 50 of the half clamp 33 are adjacent to each other, forming the end bracket 35. An aligning through hole of the end bracket 34 is formed by aligned holes in the end flanges 46 and 51, respectively. An aligning through hole of the end bracket 35 is formed by aligned holes in the end flanges 47 and 50, respectively.

The wall brackets of the vertical support 11 are identical with each other; and the wall bracket 19, as typical thereof, is shown in greater detail in FIG. 10 and FIG. 11. The wall bracket 19 is a metal or metal casting fixture. The wall bracket 19 has a base 54 and two parallel flanges 55 and 56. Each of the flanges 55 and 56 have aligned holes, forming an aligning through hole. The base 54 of the wall bracket 19 has two or more holes. The wall bracket 19 is mechanically fastened or bolted to the silo wall 2.

The sets of the braces of the vertical support 11 are identical with each other. The brace 27, being typical of the braces, is shown in greater detail in FIG. 7 through FIG. 11. The brace 27 is a metal rod or cable having two end holes, one each for the inner end 57 and the outer end 58 thereof, for receiving the fasteners or bolts 38 and 42. The clamp end bracket 34 receives the inner end 57 of the brace 27 and retains the inner end 57 therein by the bolt 38 passing through the aligning through hole of the clamp end bracket 34 and the inner end hole of the brace 27. The wall bracket 19 receives the outer end 58 of the brace 27 and retains the outer end 58 therein by the bolt 42 passing through the aligning through hole of the wall bracket 19 and the outer end hole of the brace 27.

Figure 12:
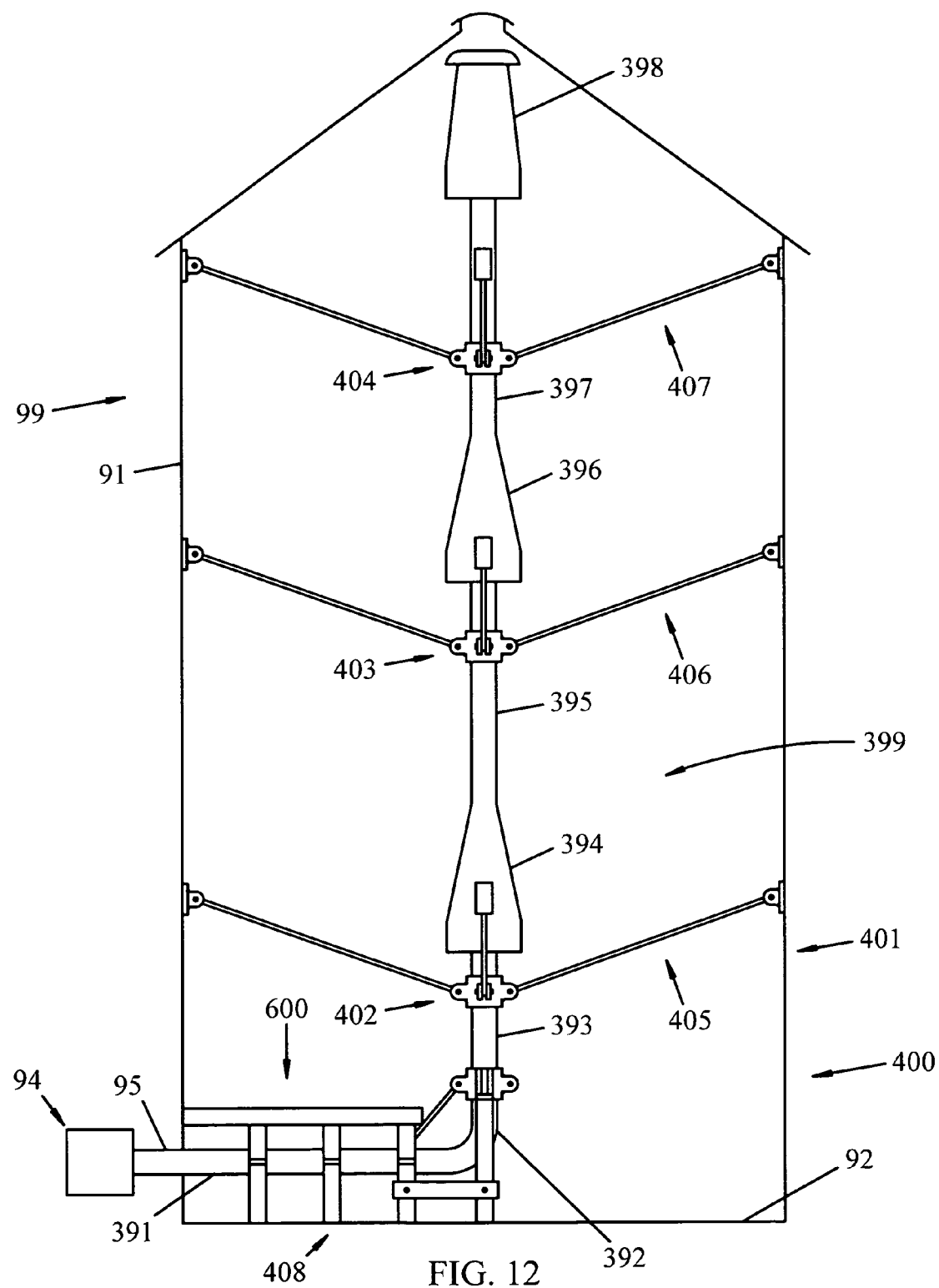
FIG. 12 is a schematic side view of another embodiment of the present invention within a storage silo comprising a vertical support comprising three clamp assemblies with braces and wall brackets, a horizontal support comprising four clamp assemblies with support legs, and a deflector.
Figure 35:
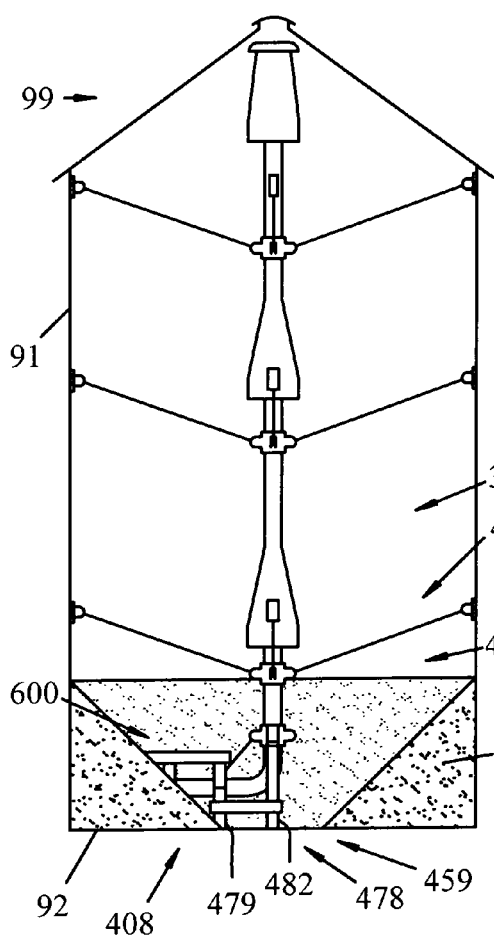
FIG. 35 is a schematic view of the embodiment of the present invention, as shown in FIG. 12, showing the extracting of the material from the silo until one of the support legs is accessible during the removal of the material from the silo.

Another embodiment of the present invention is shown schematically in FIG. 12 as, generally, a support system 400. The support system 400 supports a delivery system 399 that has a horizontal section and a vertical section and at least an elbow interconnecting the horizontal and vertical sections that together comprise a series of tubes and separators within a vertical storage silo 99 having a wall 91 and a floor 92. The delivery system 399 may be generally identical to the delivery system 10 of the embodiment of the present invention hereinbefore described and as shown in FIG. 1 through FIG. 11, and similarly comprises, in the embodiment shown in FIG. 12, the horizontal section having a horizontal tube 391, the elbow 392, and the vertical section having vertical tubes 393, 395, and 397 and separators 394, 396, and 398. The delivery system 399 delivers granular material 93 to the silo 99 for removably storing the material 93, as shown in FIG. 35, and may so deliver generally identically to the delivery system 10. The delivery system 399 so delivers the material 93 when the material is transported by a conveyor entraining the material within a flow of fluid, as, in accordance with one embodiment of the present invention, a conventional pneumatic conveyor system 94, having a pneumatic transfer tube 95, that entrains the material within a flow of air, as a pneumatic material flow, for depositing the material 93 into the silo 99. The delivery system 399 comprises an outlet of the conveyor system 94. The silo 99, the material 93, and the pneumatic conveyor system 94 may be generally identical to the silo 1, the material 3, and the pneumatic conveyor system 5, respectively, hereinbefore described in reference to FIG. 1 through FIG. 11.

The tube 95 connects to the horizontal tube 391 of the horizontal section of the delivery system 399, which is interconnected with the vertical tube 393 of the vertical section of the delivery system 399 by the elbow 392, for conveying the pneumatic material flow into the silo 99. The vertical tube 393 is located at and along the vertical center of the silo 99. The vertical tube 393 is connected to the upstream separator 394 of the delivery system 399 by slipping into the upstream separator 394. The upstream separator 394 comprises the vertical tube 395 and selectively separates the material 93 from the airflow for depositing into the silo 99. The vertical tube 395 is connected to the downstream separator 396 of the delivery system 399 by slipping into the downstream separator 396. The downstream separator 396 is vertically above and downstream of the upstream separator 394. The downstream separator 396 comprises the vertical tube 397 and selectively separates the material 93 from the airflow for depositing into the silo 99. The vertical tube 397 connects to the top separator 398 of the delivery system 399 that is vertically above and downstream of the upstream and downstream separators 394 and 396. The top separator 398 comprises an open cap and selectively separates the material 93 from the airflow for depositing into the silo 99.

The support system 400 comprises a vertical support 401 and a horizontal support 408. The vertical support 401 suspends and centers the delivery system 399 within the silo 99, and reinforces the silo 99 against collapse. The horizontal support 408 selectively supports the delivery system 399 upon the floor 92 of the silo 99. The supported weight and forces of the delivery system 399 and the material 93 when stored within the silo 99 are distributed between the vertical support 401 and the horizontal support 408.

The vertical support 401 has a plurality of clamp assemblies mounted on the vertical tubes of the vertical section of the delivery system 399; and in particular, for the embodiment shown in FIG. 12, clamp assemblies 402, 403, and 404. The clamp assembly 402 is positioned on the vertical tube 393 near the upstream separator 394 for suspending and centering the vertical tube 393 within the silo 99. The clamp assembly 403 is positioned on the vertical tube 395 near the downstream separator 396 for suspending and centering the vertical tube 395 and the upstream separator 394 within the silo 99. The clamp assembly 404 is positioned on the vertical tube 397 for suspending and centering the vertical tube 397 and the downstream separator 396 within the silo 99. The vertical support 401 further includes wall brackets on the silo wall 91, and sets 405, 406, and 407 of braces interconnecting the clamp assemblies 402, 403, and 404, respectively, with the wall brackets on the silo wall 91, thereby suspending and centering the vertical tubes and the separators of the delivery system 399 within the silo 99. The silo wall 91 is thus interconnected throughout and within the silo 99 by the vertical support 401, specifically, for the embodiment shown in FIG. 12, the clamp assemblies 402, 403, and 404, the sets 405, 406, and 407 of the braces, and the respective wall brackets therefor, simultaneously reinforcing the silo wall 91 against collapse of the silo 99 as well as supporting the delivery system 399.

The clamp assemblies 402, 403, and 404, the sets 405, 406, and 407 of braces, and the wall brackets of the vertical support 401 are generally identical to the clamp assemblies, the sets of braces, and the wall brackets of the embodiment of the present invention hereinbefore described and as shown in FIG. 1 through FIG. 11. Each clamp assembly of the vertical support 401 includes a clamp having two equal half clamps mounted on and clamping around the respective vertical tube. Each clamp has end brackets and one or more side brackets. The braces of each set of braces of the vertical support 401 are evenly spaced around the respective vertical tube; and are connected at one end thereof to the brackets of the respective clamp by fasteners or bolts as connectors and are secured, as by nuts when bolts are used. For each clamp assembly, the respective wall brackets are evenly spaced on, and connected to, the inner surface of the silo wall 91 on a horizontal plane above the height of the clamp assembly thereof; and opposite ends of the braces are connected to the respective wall brackets by fasteners or bolts, and are secured, as by nuts when bolts are used, thereby equally connecting the brackets of each of the clamps of the clamp assemblies of the vertical support 401 to the silo wall 91. Each brace has a length equal to or greater than the radius of the silo 99, and extends radially upwardly and outwardly from the clamp assembly thereof to the wall brackets.

Figure 13:
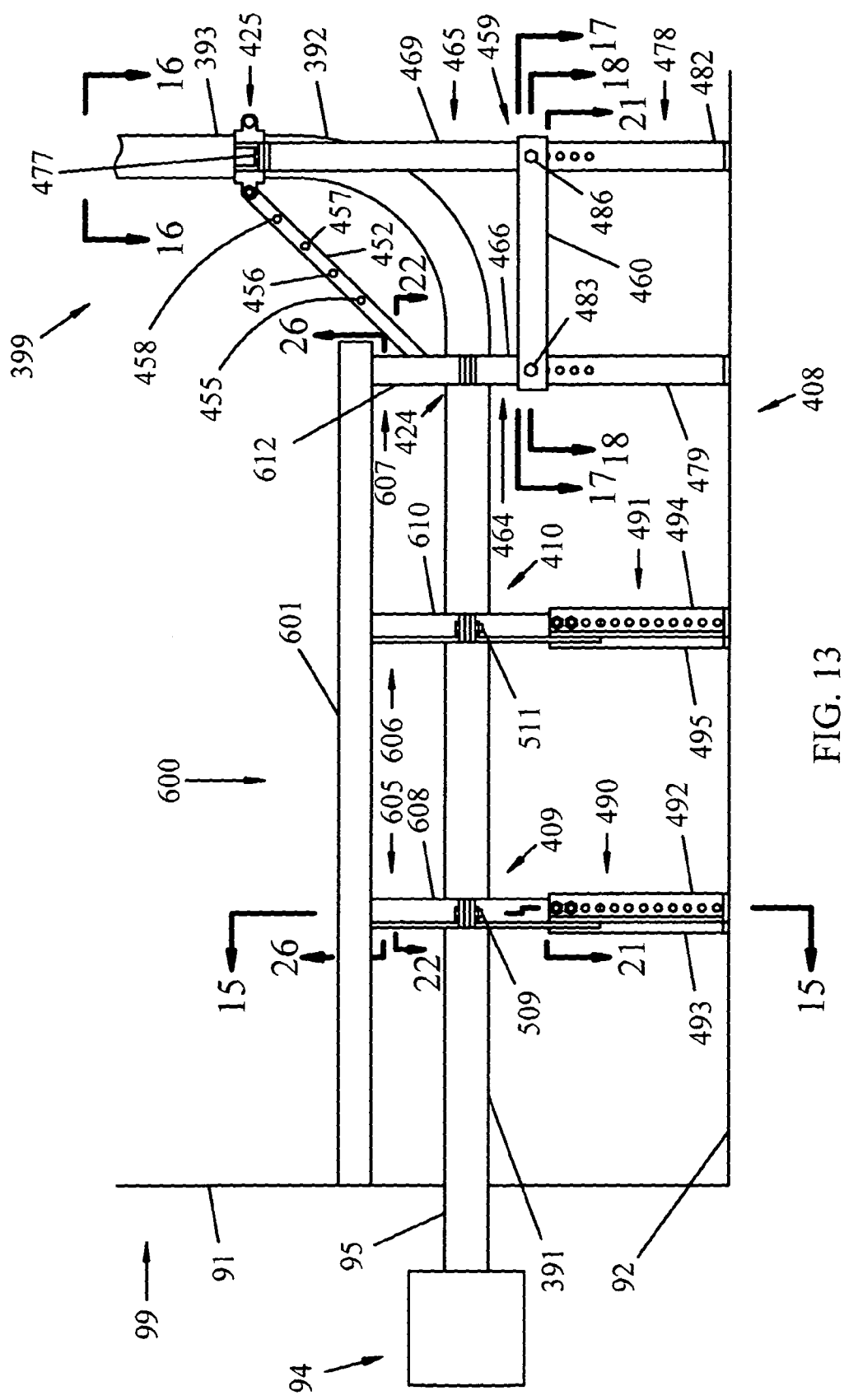
FIG. 13 is a side view of the embodiment of the present invention, as shown in FIG. 12, within the storage silo, partly schematically and broken, showing the horizontal support comprising four clamp assemblies, support legs in deployed positions, a subframe, stanchions, and a deflector.

The horizontal support 408 has a plurality of clamp assemblies mounted on the horizontal tube 391 of the horizontal section of the delivery system 399; and in particular, for the embodiment shown in FIG. 13, clamp assemblies 409 and 410. The clamp assemblies of the horizontal support 408 mounted on the horizontal tube 391 are identical with each other; and, as such, the clamp assembly 409 is typical. The clamp assembly 409 is shown in greater detail in FIG. 15.

The clamp assembly 409 comprises a clamp 411 having an inside circumference less than the outside circumference of the horizontal tube 391. The clamp 411 is composed of metal plate or metal casting. The clamp 411 is a union of two equal half clamps 412 and 413.

The half clamp 412 has an outwardly radiating end flange 416 on one end for forming an end bracket 414, and an outwardly radiating end flange 417 on the other end for forming an end bracket 415. The half clamp 412 has a side flange 418 evenly spaced between the ends of the half clamp 412 that is radially perpendicular to the outer surface of the half clamp 412, extending across the width of the half clamp 412. Each of the flanges 416, 417, and 418 has a through hole therein.

The half clamp 413 has an outwardly radiating end flange 419 on one end for forming the end bracket 415, and an outwardly radiating end flange 420 on the other end for forming the end bracket 414. The half clamp 413 has a side flange 421 evenly spaced between the ends of the half clamp 413 that is radially perpendicular to the outer surface of the half clamp 413, extending across the width of the half clamp 413. Each of the flanges 419, 420, and 421 has a through hole therein.

When the half clamps 412 and 413 are mounted onto the horizontal tube 391, as shown in FIG. 15, the end flange 416 of the half clamp 412 and the end flange 420 of the half clamp 413 are adjacent to each other, forming the end bracket 414; and the end flange 417 of the half clamp 412 and the end flange 419 of the half clamp 413 are adjacent to each other, forming the end bracket 415. The through holes in the end flanges 416 and 420 are aligned, forming an aligning through hole of the end bracket 414; and the through holes in the end flanges 417 and 419 are aligned, forming an aligning through hole of the end bracket 415. Fasteners or bolts 422 and 423 pass through the through holes of the end brackets 414 and 415, respectively, and are secured, as by nuts when bolts are used, joining together the half clamps 412 and 413 to form the clamp 411.

As shown in FIG. 13 and FIG. 14, the horizontal support 408 further includes a horizontal elbow clamp assembly 424 mounted on the horizontal tube 391 adjacent the elbow 392, and a vertical elbow clamp assembly 425 mounted on the vertical tube 393 adjacent the elbow 392. The horizontal elbow clamp assembly 424, shown in FIG. 13, FIG. 14, and FIG. 22, is identical with the clamp assemblies of the horizontal support 408 mounted on the horizontal tube 391; and comprises, identically, a clamp 426 that is a union of two equal half clamps 427 and 428 joined together by fasteners or bolts 433 and 434 passing through through holes of end brackets 429 and 430, respectively, that are secured, as by nuts when bolts are used. Each half clamp 427 and 428 likewise identically has a side flange 431 and 432, respectively, having a through hole therein.

The vertical elbow clamp assembly 425, as shown in FIG. 13 and FIG. 14 and in more detail in FIG. 16, comprises a clamp 435 having an inside circumference less than the outside circumference of the vertical tube 393. The clamp 435 is composed of metal plate or metal casting. The clamp 435 is a union of two equal half clamps 436 and 437.

The half clamp 436 has an outwardly radiating end flange 440 on one end for forming an end bracket 438, and an outwardly radiating end flange 441 on the other end for forming an end bracket 439. The half clamp 436 has a side flange 442. The side flange 442 is circumferentially perpendicular to the outer surface of the half clamp 436, extending along the circumferential arc length between the ends of the half clamp 436, and projects horizontally outwardly from the side of the half clamp 436. The side flange 442 is located at about the lower edge of the half clamp 436, and evenly spaced between the ends of the half clamp 436. Reinforcing gussets 443 and 444, generally triangularly shaped, interconnect the upper surface of the side flange 442 and the outer surface of the half clamp 436 for reinforcing the side flange 442 from deflecting vertically. Each of the flanges 440, 441, and 442 has a through hole therein.

The half clamp 437 has an outwardly radiating end flange 445 on one end for forming the end bracket 439, and an outwardly radiating end flange 446 on the other end for forming the end bracket 438. The half clamp 437 has a side flange 447. The side flange 447 is circumferentially perpendicular to the outer surface of the half clamp 437, extending along the circumferential arc length between the ends of the half clamp 437, and projects horizontally outwardly from the side of the half clamp 437. The side flange 447 is located at about the lower edge of the half clamp 437, and evenly spaced between the ends of the half clamp 437. Reinforcing gussets 448 and 449, generally triangularly shaped, interconnect the upper surface of the side flange 447 and the outer surface of the half clamp 437 for reinforcing the side flange 447 from deflecting vertically. Each of the flanges 445, 446, and 447 has a through hole therein.

When the half clamps 436 and 437 are mounted onto the vertical tube 393, as shown in FIG. 16, the end flange 440 of the half clamp 436 and the end flange 446 of the half clamp 437 are adjacent to each other, forming the end bracket 438; and the end flange 441 of the half clamp 436 and the end flange 445 of the half clamp 437 are adjacent to each other, forming the end bracket 439. The through holes in the end flanges 440 and 446 are aligned, forming an aligning through hole of the end bracket 438; and the through holes in the end flanges 441 and 445 are aligned, forming an aligning through hole of the end bracket 439. Fasteners or bolts 450 and 451 pass through the through holes of the end brackets 438 and 439, respectively, and are secured, as by nuts when bolts are used, joining together the half clamps 436 and 437 to form the clamp 435.

The horizontal support 408 further includes an elbow brace 452 interconnecting the horizontal elbow clamp assembly 424 and the vertical elbow clamp assembly 425 above the elbow 392, as shown in FIG. 13, FIG. 16, and FIG. 22, for reinforcing the elbow clamp assemblies 424 and 425. The elbow brace 452 is a metal rod or bar having a lower end 453, an upper end 454, and two end holes, one each for the ends 453 and 454 thereof, for receiving the fasteners or bolts 433 and 451, respectively. The elbow brace 452 has a plurality of storing holes 455, 456, 457, and 458 along the length thereof. The clamp end bracket 429 of the horizontal elbow clamp assembly 424 receives the lower end 453 of the elbow brace 452 and retains the lower end 453 therein by the bolt 433 passing through the through hole of the clamp end bracket 429 and the lower end hole of the elbow brace 452. The clamp end bracket 439 of the vertical elbow clamp assembly 425 receives the upper end 454 of the elbow brace 452 and retains the upper end 454 therein by the bolt 451 passing through the through hole of the clamp end bracket 439 and the upper end hole of the elbow brace 452.

The horizontal support 408 further includes a subframe 459 that also interconnects and reinforces the horizontal elbow clamp assembly 424 and the vertical elbow clamp assembly 425. The subframe 459 is below the elbow 392, and extends underneath and between the horizontal elbow clamp assembly 424 and the vertical elbow clamp assembly 425.

The subframe 459 comprises a plurality of interconnected girders, and in particular, for the embodiment shown in FIG. 13, FIG. 14, FIG. 17, and FIG. 18, girders 460, 461, 462, and 463. The subframe 459 has a generally rectangular plan shape, either of unequal length and width or, as shown for girders 460, 461, 462, and 463, equal length and width forming a square. Each of the girders 460, 461, 462, and 463 is metal and has an angle cross section of either unequal or, as shown, equal flange length, and may be angle iron for ease and simplicity of construction. For the embodiment shown in FIG. 13, FIG. 14, FIG. 17, and FIG. 18, each of the girders 460, 461, 462, and 463 has a first of the flanges thereof oriented horizontally and on top, and a second of the flanges thereof oriented vertically and on the outer side of the subframe 459. The ends of each of the girders 460, 461, 462, and 463 are cut at angles and joined together, as by welding, forming the rectangle of the subframe 459. The subframe 459 has through holes near each end of each of the girders 460 and 462 in the vertically oriented flanges thereof that are parallel with the elbow 392.

The subframe 459 further includes an inner set 464 of stanchions 466 and 467, and an outer set 465 of stanchions 468 and 469. Each of the stanchions 466, 467, 468, and 469 is metal and has an angle cross section of either unequal or, as shown, equal flange length, and may be angle iron for ease and simplicity of construction. Each of the stanchions 466, 467, 468, and 469 has first and second flanges thereof oriented outwardly adjacent the outer side of the subframe 459, as shown in FIG. 17. The stanchions 466, 467, 468, and 469 are attached at the lower ends thereof to the girders 460, 461, 462, and 463, as by welding, on the tops of the girders 460, 461, 462, and 463, and offset inwardly from the outer side of the subframe 459, as shown in FIG. 17, by an amount equal to the thickness of the vertically oriented flanges of the girders 460, 461, 462, and 463. Alternatively, a foot may be attached, as by welding, to the lower end of each of the stanchions, respectively, and then the feet so attached to the girders and so offset inwardly. Each of the stanchions 466, 467, 468, and 469 has a cap 470, 471, 472, and 473 attached to the upper end thereof, respectively, as by welding. Each of the caps 470, 471, 472, and 473 may be a flat plate, as shown, for ease and simplicity of construction. Each of the caps 470, 471, 472, and 473 has a through hole therein.

The inner set 464 of the stanchions 466 and 467 interconnect the horizontal elbow clamp assembly 424 and the girders 460, 461, 462, and 463 of the subframe 459. The outer set 465 of the stanchions 468 and 469 interconnect the vertical elbow clamp assembly 425 and the girders 460, 461, 462, and 463 of the subframe 459. The through holes in the side flanges 431 and 432 of the horizontal elbow clamp assembly 424 align with the through holes in the caps 470 and 471 for connecting the caps 470 and 471 with the horizontal elbow clamp assembly 424; and the through holes in the side flanges 447 and 442 of the vertical elbow clamp assembly 425 align with the through holes in the caps 472 and 473 for connecting the caps 472 and 473 with the vertical elbow clamp assembly 425. As shown in FIG. 13, FIG. 14, and FIG. 16, fasteners or bolts 474, 475, 476, and 477 pass through the aligned through holes of the side flanges 431, 432, 447, and 442 and the caps 470, 471, 472, and 473, respectively, and are secured, as by nuts when bolts are used, attaching together the elbow clamp assemblies 424 and 425 and the subframe 459. As shown in FIG. 14, the stanchions 466, 467, 468, and 469 are angled from the vertical.

The horizontal support 408 also includes a set 478 of removable support legs 479, 480, 481, and 482 attachable to the subframe 459 for selectively supporting the delivery system 399 upon the floor 92 of the silo 99 by selectively supporting the subframe 459 of the horizontal support 408 of the support system 400 upon the silo floor 92. Each of the removable support legs 479, 480, 481, and 482 has first and second flanges thereof oriented outwardly adjacent the outer side of the subframe 459, as shown in FIG. 18. Fasteners or bolts 483, 484, 485, and 486 pass through the through holes in the girders 460 and 462 that align with through holes in the flanges of the removable support legs 479, 480, 481, and 482, respectively, and are secured, as by nuts when bolts are used, attaching the removable support legs 479, 480, 481, and 482 to the subframe 459. When so attached, the upper ends of the removable support legs 479, 480, 481, and 482 are against the inner surfaces of the horizontally oriented flanges of the girders 460, 461, 462, and 463 of the subframe 459, and the flanges of the removable support legs 479, 480, 481, and 482 are against the inner surfaces of the vertically oriented flanges of the girders 460, 461, 462, and 463 of the subframe 459, offsetting the upper ends thereof inwardly from the outer side of the subframe 459, as shown in FIG. 18, by an amount equal to the thickness of the vertically oriented flanges of the girders 460, 461, 462, and 463, so that the upper ends of the removable support legs 479, 480, 481, and 482 are directly below the lower ends of the stanchions 466, 467, 468, and 469.

One embodiment of the removable support legs 479, 480, 481, and 482 comprises an integral support leg 487, shown in more detail in FIG. 19, that is premeasured for length to correctly space the subframe 459 from the silo floor 92 for selectively supporting the delivery system 399 upon the silo floor 92. The support leg 487 is metal and has an angle cross section of either unequal or, as shown, equal flange length, and may be angle iron for ease and simplicity of construction. The support leg 487 has a plurality of through holes in both flanges thereof either in only the upper portion as shown, or alternatively along the full length thereof. One of the through holes in one of the flanges of the support leg 487 aligns with one of the through holes in one of the girders 460 and 462 for receiving one of the fasteners or bolts 483, 484, 485, and 486. The support leg 487 has a foot 488 attached to the lower end thereof, as by welding. The foot 488 may be a flat plate, as shown, for ease and simplicity of construction. The foot 488 has a locking pin 489 attached, as by welding, to the lower surface thereof.

The horizontal support 408 also includes a set of removable support legs attachable to each of the clamp assemblies thereof for selectively supporting the delivery system 399 upon the floor 92 of the silo 99 by selectively supporting the clamp assemblies of the horizontal support 408 of the support system 400 upon the silo floor 92; and in particular, for the embodiment shown in FIG. 13, sets 490 and 491 of removable support legs 492 and 493, and 494 and 495 for the clamp assemblies 409 and 410, respectively.

One embodiment of the removable support legs 492 and 493, and 494 and 495 comprises a separable support leg 496, shown in more detail in FIG. 20. The support leg 496 comprises an upper leg section 497 and a lower leg section 498. The upper leg section 497 is metal and has an angle cross section of either unequal or, as shown, equal flange length, and may be angle iron for ease and simplicity of construction. The upper leg section 497 has two through holes in a first flange 499 thereof, and a storing hole 501 in a second flange 500 thereof. The upper leg section 497 has a cap 502 attached to the upper end thereof, as by welding. The cap 502 may be a flat plate, as shown, for ease and simplicity of construction. The cap 502 has a through hole therein. The upper leg section 497 has a standard length and configuration.

The lower leg section 498 is metal and has an angle cross section of either unequal or, as shown, equal flange length, and may be angle iron for ease and simplicity of construction. The lower leg section 498 has a plurality of through holes in both flanges thereof along the full length thereof. Fasteners or bolts 503 and 505 pass through the two through holes in the first flange 499 of the upper leg section 497 that align with two of the through holes in one of the flanges of the lower leg section 498, respectively, and are secured, as by nuts 504 and 506 when bolts are used, attaching the leg sections 497 and 498 together, forming the support leg 496. When so attached, the flanges of the lower leg section 498 are against the inner surfaces of the flanges of the upper leg section 497, offsetting the lower end of the lower leg section 498 from the upper end of the upper leg section 497 by an amount equal to the thickness of the flanges of the upper leg section 497.

In the embodiment of the support leg 496 as shown in FIG. 20, the lower leg section 498 is of stock material. The correct length is measured, at the silo 99 either during or after installation of the delivery system 399 or the support system 400 or any other convenient time such as when any of the removable support legs 492, 493, 494, or 495 or leg sections thereof are replaced, to correctly space each of the clamp assemblies of the horizontal support 408 of the support system 400 from the silo floor 92 for selectively supporting the delivery system 399 upon the silo floor 92. After the correct length has been measured, the lower leg section 498 is cut from the stock material, and a foot 507 is attached to the lower end thereof, as by welding. The foot 507 may be a flat plate, as shown, for ease and simplicity of construction. The foot 507 has a locking pin 508 attached, as by welding, to the lower surface thereof.

The through holes in the side flanges of the clamp assemblies 409 and 410 of the horizontal support 408 align with the through holes in the caps of the removable support legs 492 and 493, and 494 and 495. As shown in FIG. 13 and FIG. 22, fasteners or bolts 509, 510, 511, and 512 pass through the aligned through holes of these side flanges and these caps, respectively, and are secured, as by nuts when bolts are used, attaching the removable support legs 492 and 493, and 494 and 495 to the clamp assemblies 409 and 410. When so attached, as shown in FIG. 21, the removable support legs 492 and 493, and 494 and 495 are oriented so that the flanges through which the fasteners or bolts 503 and 505 pass to attach the respective leg sections 497 and 498 together are oriented inwardly, parallel with the horizontal section of the delivery system 399, and the other flanges thereof are oriented perpendicularly outwardly. Each upper leg section 497 of the respective removable support legs 492 and 493, and 494 and 495 of each of the sets 490 and 491 thereof are horizontally aligned with each other and the clamp assemblies 409 and 410 thereof, respectively, when so attached; however, due to the offsetting of the lower leg section 498 from the upper leg section 497 of the respective removable support legs 492 and 493, and 494 and 495, the respective lower leg section 498 of each of the sets 490 and 491 of the removable support legs 492 and 493, and 494 and 495 are horizontally offset.

The removable support legs of the horizontal support 408 are rotationally symmetric. As shown in FIG. 21, and further shown in FIG. 13, FIG. 14, and FIG. 18, the removable support legs 479, 480, 481, and 482 that are attachable to the subframe 459 differ from each other only in orientation by a rotation of ninety degrees, in order from leg 479 to leg 480 to leg 481 to leg 482, about an axis that is parallel with both flanges of the respective removable support leg. As shown in FIG. 21, and further shown in FIG. 13, FIG. 14, and FIG. 15, the removable support legs 492 and 493, and 494 and 495 of each of the sets 490 and 491 thereof that are attachable to the clamp assemblies 409 and 410, respectively, differ from each other only in orientation by a rotation of one hundred eighty degrees, in order from leg 492 to leg 493 and from leg 494 to leg 495, about an axis that is parallel with both flanges of the respective removable support leg. This simplifies construction and maintenance by not requiring to have right-hand and left-hand variants of the removable support legs of the horizontal support 408.

Another embodiment of the removable support legs that are attachable to the subframe 459 comprises a separable support leg, based upon measurements made at the silo 99, identical to the separable support leg 496 hereinbefore described and as shown in FIG. 20 but lacking the cap 502 thereof. Yet other embodiments of the removable support legs that are attachable to the subframe 459 comprise either an integral support leg, identical to the integral support leg 487 hereinbefore described and as shown in FIG. 19, or a separable support leg, identical to the separable support leg 496 hereinbefore described and as shown in FIG. 20, but that also includes a cap attached to the upper end thereof, as by welding.

Another embodiment of the removable support legs that are attachable to the clamp assemblies of the horizontal support 408 comprises a premeasured integral support leg, identical to the integral support leg 487 hereinbefore described and as shown in FIG. 19 but including a cap identically as the separable support leg 496 has the cap 502 hereinbefore described and as shown in FIG. 20.

The removable support legs of the horizontal support 408 selectively support the delivery system 399 upon the floor 92 of the silo 99. Each of the removable support legs are attachable to the horizontal support 408 in either a deployed position thereof or a stored position thereof. When in the deployed positions thereof, the removable support legs of the horizontal support 408 interconnect the horizontal support 408 and the silo floor 92, supporting the delivery system 399 thereupon. The removable support legs of the horizontal support 408 are removable from the deployed positions thereof, and may be placed in the stored positions thereof on the horizontal support 408, to provide an unobstructed floor area for mechanical or manual sweeping of the silo floor 92.

FIG. 13 shows the deployed positions of the removable support legs of the horizontal support 408. For the set 478 of the removable support legs 479, 480, 481, and 482 that are attachable to the subframe 459, the fasteners or bolts 483, 484, 485, and 486 therefor selectively mount the set 478 of the removable support legs 479, 480, 481, and 482 in the deployed positions thereof by removably attaching the removable support legs 479, 480, 481, and 482 to the subframe 459, as shown in FIG. 13, FIG. 14, and FIG. 18. For the sets 490 and 491 of the removable support legs 492 and 493, and 494 and 495 that are attachable to the clamp assemblies 409 and 410, respectively, the fasteners or bolts 509, 510, 511, and 512 therefor selectively mount the sets 490 and 491 of the removable support legs 492 and 493, and 494 and 495 in the deployed positions thereof by removably attaching the removable support legs 492 and 493, and 494 and 495 to the clamp assemblies 409 and 410, respectively, as shown in FIG. 13, FIG. 15, and FIG. 22.

The locking pins on the feet of the removable support legs of the horizontal support 408, as the locking pin 489 of the foot 488 shown in FIG. 19 and the locking pin 508 of the foot 507 shown in FIG. 20, selectively lock the lower ends of the removable support legs, when the removable support legs are in the deployed positions thereof, by removably fitting into sockets in the silo floor 92, as shown in FIG. 15 for the locking pins 513 and 514 and the sockets 515 and 516 for the set 490 of the removable support legs 492 and 493.

Figure 23:
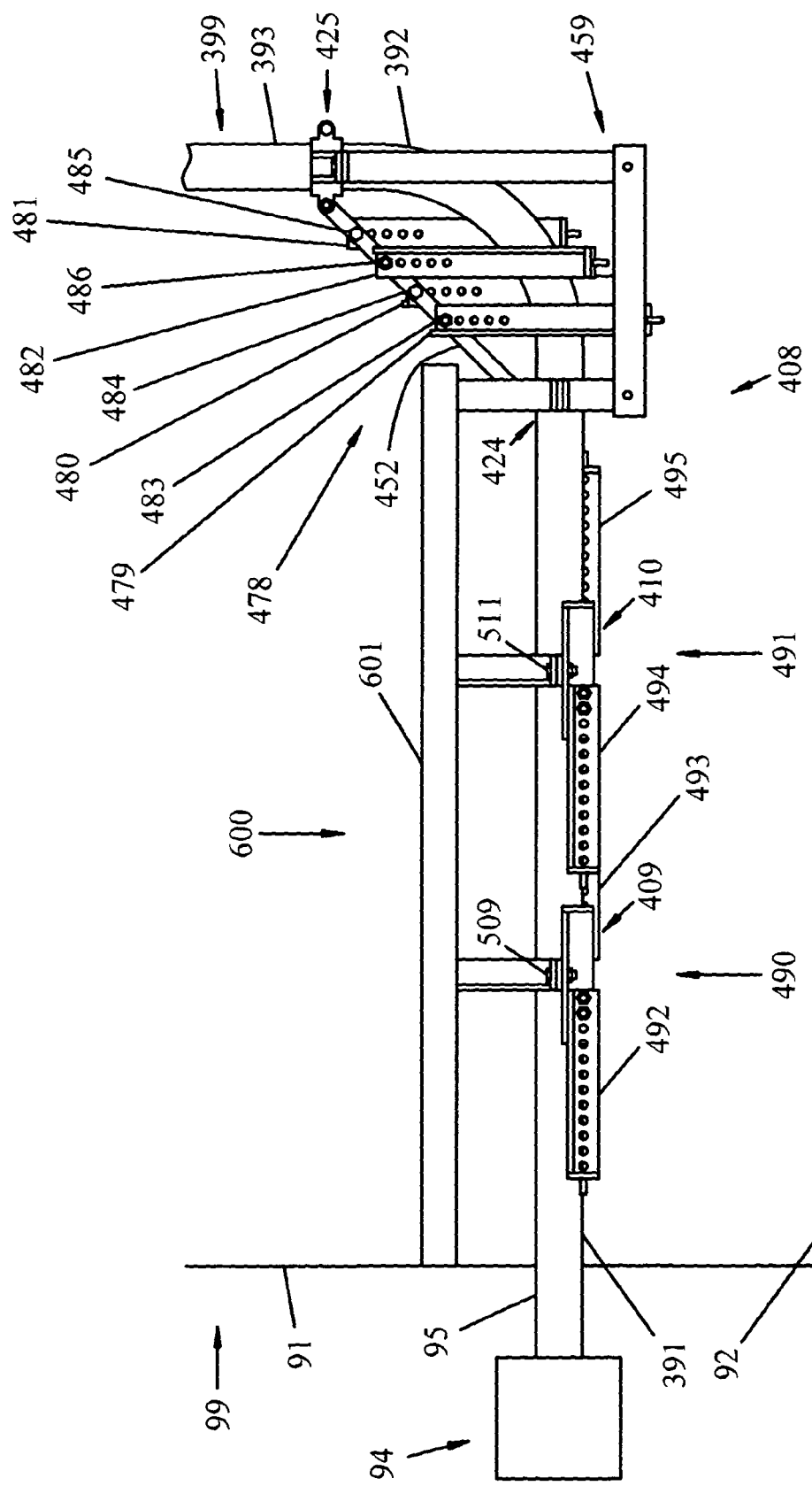
FIG. 23 is a side view of the embodiment of the present invention, as shown in FIG. 13, showing the support legs of the horizontal support in stored positions.

FIG. 23 shows the stored positions of the removable support legs of the horizontal support 408. For the set 478 of the removable support legs 479, 480, 481, and 482 that are attachable to the subframe 459, the fasteners or bolts 483, 484, 485, and 486 therefor are removed therefrom and the set 478 of the removable support legs 479, 480, 481, and 482 are removed from the deployed positions thereof. Subsequently, the removable support legs 479, 480, 482, and 481 may be placed adjacent the elbow brace 452 on opposite sides thereof and aligned with every other of the storing holes 455, 456, 457, and 458 thereof for clearance therebetween. When so placed, the fasteners or bolts 483, 484, 486, and 485 are then passed through the storing holes 455, 456, 457, and 458 of the elbow brace and the aligned through holes of the removable support legs 479, 480, 482, and 481, respectively, selectively mounting the set 478 of the removable support legs 479, 480, 481, and 482 in the stored positions thereof by removably attaching the removable support legs 479, 480, 481, and 482 to the elbow brace 452, as shown in FIG. 23.

For the sets 490 and 491 of the removable support legs 492 and 493, and 494 and 495 that are attachable to the clamp assemblies 409 and 410, respectively, the fasteners or bolts 509, 510, 511, and 512 therefor are removed therefrom and the sets 490 and 491 of the removable support legs 492 and 493, and 494 and 495 are removed from the deployed positions thereof. Subsequently, the removable support legs 492 and 493, and 494 and 495 may be placed so that the storing hole 501 of each of the removable support legs 492 and 493, and 494 and 495 is aligned with and below the through hole of the side flange of the clamp assemblies 409 and 410, respectively. When so placed, the fasteners or bolts 509, 510, 511, and 512 are then passed through the through holes of the side flanges of the clamp assemblies 409 and 410 and the aligned storing holes 501 of the removable support legs 492 and 493, and 494 and 495, respectively, selectively mounting the sets 490 and 491 of the removable support legs 492 and 493, and 494 and 495 in the stored positions thereof by removably attaching the removable support legs 492 and 493, and 494 and 495 to the clamp assemblies 409 and 410, respectively, as shown in FIG. 23.

When in the stored positions thereof, the locking pins on the feet of the removable support legs of the horizontal support 408, as the locking pin 489 of the foot 488 shown in FIG. 19 and the locking pin 508 of the foot 507 shown in FIG. 20, are removed from the sockets therefor in the silo floor 92, as shown in FIG. 23.

Figure 24:
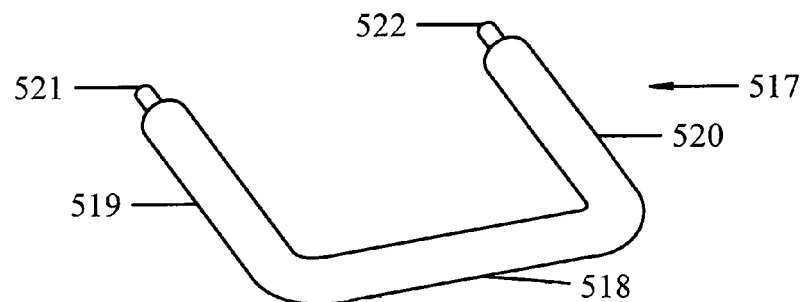
FIG. 24 is a perspective view of one embodiment of a bin sweep bumper of the present invention.
Figure 25:
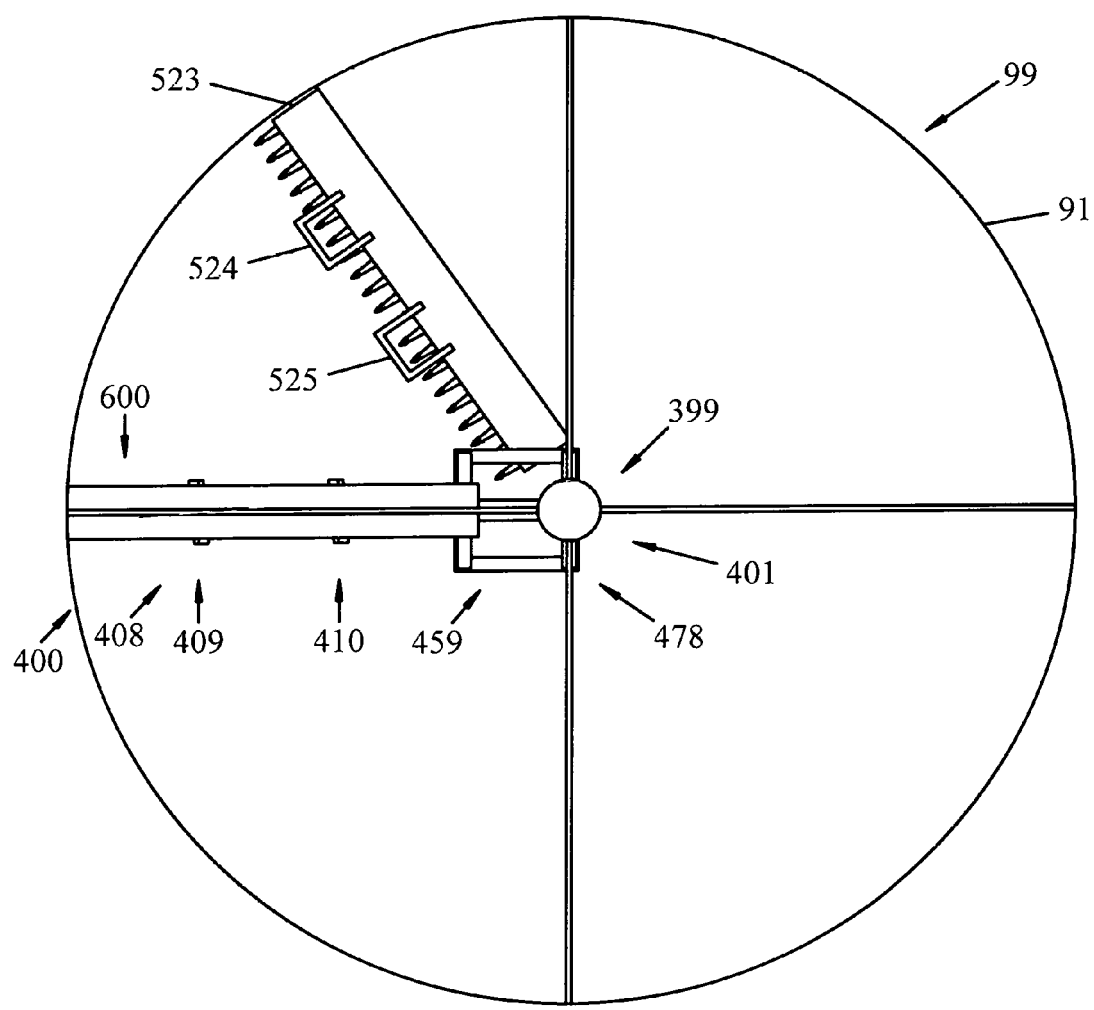
FIG. 25 is a schematic top view of one embodiment of the present invention, as shown in FIG. 12, within a storage silo having a bin sweep comprising bin sweep bumpers of the present invention.

Another embodiment of the present invention comprises a bin sweep bumper 517. As shown in FIG. 24, the bin sweep bumper 517 has a crossbeam 518 and a plurality of supports 519 and 520. The supports 519 and 520 each has a fastener or bolt 521 and 522, respectively, for attaching the bin sweep bumper 517 to a mechanical bin sweep 523. The mechanical bin sweep 523 is known in the art for mechanically sweeping the silo floor during the emptying of the silo. As shown in FIG. 25, the mechanical bin sweep 523 has a plurality of the bin sweep bumpers, and in particular bin sweep bumpers 524 and 525, generally identical with the bin sweep bumper 517 shown in FIG. 24, one for each set of the removable support legs that is attachable to the clamp assemblies, respectively, of the horizontal support 408. Each bin sweep bumper, when mount on and attached to the mechanical bin sweep 523, is aligned with one of the sets of the removable support legs of the horizontal support 408. Each bin sweep bumper, when so mounted and attached, projects beyond the mechanical bin sweep 523 in the direction of movement thereof. The bin sweep bumpers protect the mechanical bin sweep 523 from damage, when the mechanical bin sweep is moving during the emptying of the silo, due to impacting against the removable support legs of the horizontal support 408 when in the deployed positions thereof, by bumping first against the removable support legs of the horizontal support 408 before the mechanical bin sweep 523 itself can impact thereagainst.

Another embodiment of the present invention comprises a deflector 600, shown schematically in FIG. 12. The deflector 600 protects the horizontal section of the delivery system 399 from damage, as by crushing of the horizontal tube 391 thereof, that may occur during delivery of the material 93 into the silo 99 or settling of the material 93 within the silo 99 during storage thereof or during emptying of the material 93 from the silo 99.

The deflector 600 has at least one angled wall, and in particular, for the embodiment shown in FIG. 15 and FIG. 26 and also FIG. 13 and FIG. 14, a first angled wall 601 and a second angled wall 602. The walls 601 and 602 of the deflector 600 are flat metal, and are formed from a single piece of metal bent into an inverted V shape for ease and simplicity of construction. Alternatively, the walls of the deflector 600 may be formed from a plurality of pieces; and alternatively, the walls of the deflector 600 may be curved. A plurality of crossbeams, and in particular, for the embodiment shown in FIG. 26, crossbeams 603 and 604, interconnect and reinforce the angled walls 601 and 602, and are attached thereto, as by welding.

The deflector 600 further includes a set of stanchions, attached to each of the clamp assemblies of the horizontal support 408 of the support system 400 that is mounted on the horizontal tube 391 of the horizontal section of the delivery system 399, for supporting the deflector 600 above generally the horizontal section of the delivery system 399; and in particular, for the embodiment shown in FIG. 13, FIG. 22, and FIG. 26, sets 605, 606, and 607 of stanchions 608 and 609, 610 and 611, and 612 and 613 for the clamp assemblies 409, 410, and 424, respectively.

Each of the stanchions 608 and 609, 610 and 611, and 612 and 613 is metal and has an angle cross section of either unequal or, as shown, equal flange length, and may be angle iron for ease and simplicity of construction. Each of the stanchions 608 and 609, 610 and 611, and 612 and 613 has first and second flanges thereof oriented identically with the flanges of the removable support legs 492 and 493, and 494 and 495 and the stanchions 466 and 467, respectively, as shown in FIG. 22 and FIG. 21. The upper ends of the stanchions 608 and 609, 610 and 611, and 612 and 613 are cut at an angle to match the angle of the deflector walls 601 and 602, and are attached to the deflector walls 601 and 602, as by welding. Each of the stanchions 608 and 609, 610 and 611, and 612 and 613 has a foot 614 and 615, 616 and 617, and 618 and 619 attached to the lower end thereof, respectively, as by welding. Each of the feet 614 and 615, 616 and 617, and 618 and 619 may be a flat plate, as shown, for ease and simplicity of construction. Each of the feet 614 and 615, 616 and 617, and 618 and 619 has a through hole therein.

The through holes in the side flanges of the clamp assemblies 409, 410, and 424 align with the through holes in the feet 614 and 615, 616 and 617, and 618 and 619, respectively. As shown in FIG. 22, the fasteners or bolts 509, 510, 511, 512, 474, and 475 pass through the aligned through holes of the side flanges of the clamp assemblies 409, 410, and 424 and of the feet 614 and 615, 616 and 617, and 618 and 619, respectively, and are secured, as by nuts when bolts are used, attaching together the deflector 600 and the clamp assemblies 409, 410, and 424 of the horizontal support 408. When so attached and when the removable support legs 492 and 493, and 494 and 495 are in the deployed positions thereof, the feet of the deflector 600 and the caps of the sets 490 and 491 of the removable support legs of the horizontal support 408 and of the inner set 464 of the stanchions of the subframe 459 sandwich the side flanges of the clamp assemblies 409, 410, and 424, respectively, as shown in FIG. 13, FIG. 14, and FIG. 15. When so attached and when the removable support legs 492 and 493, and 494 and 495 are in the deployed positions thereof, the flanges of the stanchions 608 and 609, 610 and 611, and 612 and 613 of the deflector 600 align with the flanges of the removable support legs 492 and 493, and 494 and 495 and of the stanchions 466 and 467, respectively, as shown in FIG. 13, FIG. 21, and FIG. 22.

As shown in FIG. 15, the deflector 600 also has a flange 620 that is mechanically fastened or bolted to the silo wall 91 for connecting and supporting the end of the deflector 600 adjacent to the silo wall 91 thereto.

This description of the present invention is not intended to be limited to only metal materials. Plastic and rubber may also be substituted for any or all parts. The present invention also lends itself to colorful displays including confectionaries through the use of clear glass or clear plastic materials.

Operation

The delivery system 10 of the present invention operates to automatically sequentially fill the storage silo 1 with the material 3 when the material is transported to the silo 1 by a conveyor entraining the material within a flow of fluid. In the embodiment of the present invention shown in FIG. 1 through FIG. 11, that conveyor is the conventional pneumatic conveyor 5 that entrains the material within a flow of air for depositing the material 3 into the silo 1.

In one embodiment of the present invention that operates to automatically sequentially fill the storage silo 1 as shown in FIG. 27 and FIG. 28, FIG. 29, and FIG. 30, the pneumatic conveyor 5 operates at a relatively lower pressure. As the pneumatic conveyor 5 begins to convey the pneumatic material flow 6 into the delivery system 10, filling of the storage silo 1 commences. The horizontal tube 12 of the delivery system 10 receives the pneumatic material flow 6 from the pneumatic conveyor 5 and conveys the pneumatic material flow 6 into the silo 1. The elbow 13 directs the pneumatic material flow 6 from the horizontal tube 12 vertically into the vertical tube 14 that conveys the pneumatic material flow 6 upwardly and downstream within the silo 1.

Figure 27:
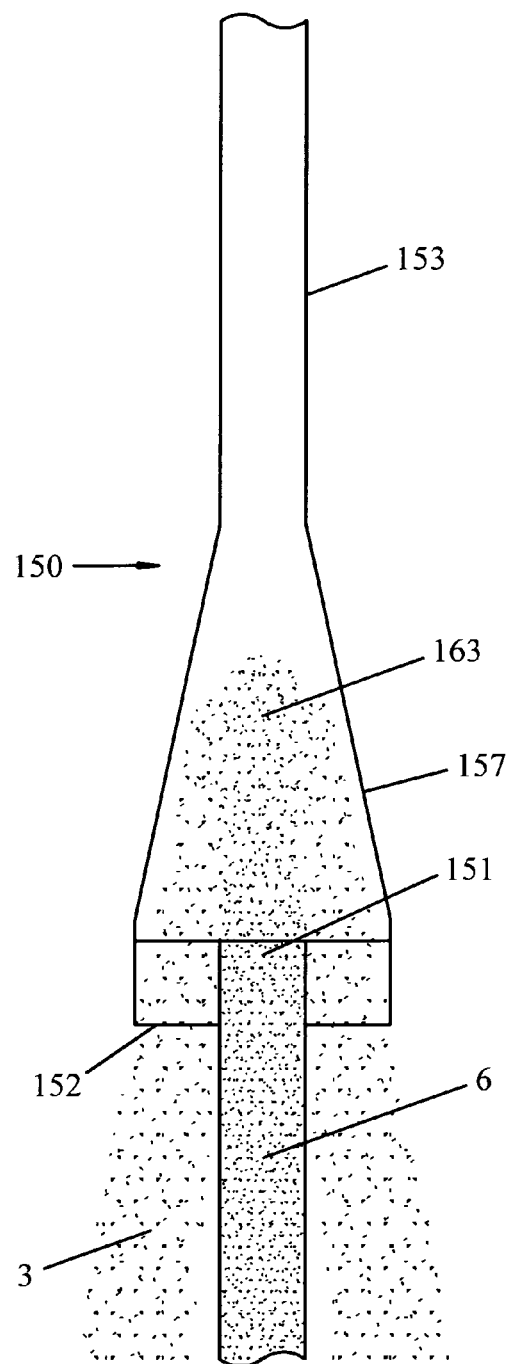
FIG. 27 is a schematic view, partly broken, of the embodiment of the present invention, as shown in FIG. 1, showing one embodiment of operation of the separator as shown in FIG. 3.

In this one embodiment of the present invention, the vertical tube 14 conveys the pneumatic material flow 6 upwardly and downstream into the first material separator 150 of the delivery system 10, which in the embodiment shown in FIG. 28 is the upstream separator 100. As shown in FIG. 27, the pneumatic material flow 6 expands from the inlet 151 into the increased diametric volume of the forcing cone 157 within the material separator 150. Insufficient air pressure results in a choking action 163 within the material separator 150, specifically within the volume of the forcing cone 157 of the material separator 150, separating the material 3 from the airflow. A flow of the separated material 3 is automatically deposited downwardly by gravity out of the material separator 150 through the outlet 152 and into the silo 1, forming a mound of the separated material 3 having a material surface 4. The airflow is rapidly released upwardly through the outlet tube 153 and also downwardly through the outlet 152. The released air is vented from the silo 1 through equalizing vents (not shown).

As the material separator 150, specifically the upstream separator 100, continues to separate the material 3 in accordance with the embodiment of the present invention as shown in FIG. 27, the flow of the separated material 3 raises the level of the material surface 4 within the silo 1 to eventually meet with and block the outlet 152 as shown in FIG. 29. This blocking of the outlet 152 automatically stops the flow, and the depositing, of the separated material 3 being deposited out of the material separator 150 through the outlet 152 into the silo 1. The air pressure within the material separator 150 rises to be sufficient for continued downstream conveying, automatically stopping the separating within the material separator 150. The pneumatic material flow 6 reestablishes within the material separator 150.

The outlet tube 153, which in the embodiment shown in FIG. 1 is the vertical tube 101, conveys the reestablished pneumatic material flow 6 upwardly and downstream into the material separator 150 of the delivery system 10 that is the next material separator 150 that is downstream of the first material separator 150. In the embodiment shown in FIG. 29, that next material separator 150 is the downstream separator 200. The downstream separator 200, which is that next material separator 150, then separates the material 3 from the airflow in the identical operation as that of the previous material separator 150 (the upstream separator 100 in the embodiment shown in FIG. 28) shown in FIG. 27. As shown in FIG. 30, the flow of the separated material 3 is deposited out of the downstream separator 200 onto the mound of the material 3 that had been deposited out of the upstream separator 100, the separated material 3 falling at most only as far as the previous material separator 150 (the upstream separator 100 in the embodiment shown in FIG. 29), again raising the level of the material surface 4.

This operation of separating the material, flowing the material, depositing the material, then stopping the flowing and the depositing of the material by blocking the outlet, and then reestablishing the pneumatic material flow 6 to convey upwardly the pneumatic material flow 6 into the next material separator 150 that is downstream is repeated for each of the material separators 150 of the delivery system 10 in sequence from the bottom of the silo 1 to the top of the silo 1. The final separator in this sequence is the top separator 300, which operates similarly as all the other material separators 150 operate. The cap 311 redirects any flow through the second outlet 303 of the top separator 300 downwardly and out of the top separator 300 into the silo 1.

In another embodiment of the present invention that operates to automatically sequentially fill the storage silo 1 as shown in FIG. 31 and FIG. 32, FIG. 33, and FIG. 34, the pneumatic conveyor 5 operates at a relatively higher pressure. Again, as the pneumatic conveyor 5 begins to convey pneumatic material flow 8, which is identical to the pneumatic material flow 6 except that the airflow from the blower of the pneumatic conveyor 5 is at the relatively higher pressure, into the delivery system 10, filling of the storage silo 1 commences. The horizontal tube 12 of the delivery system 10 receives the pneumatic material flow 8 from the pneumatic conveyor 5 and conveys the pneumatic material flow 8 into the silo 1. The elbow 13 directs the pneumatic material flow 8 from the horizontal tube 12 vertically into the vertical tube 14 that conveys the pneumatic material flow 8 upwardly and downstream within the silo 1.

Figure 31:
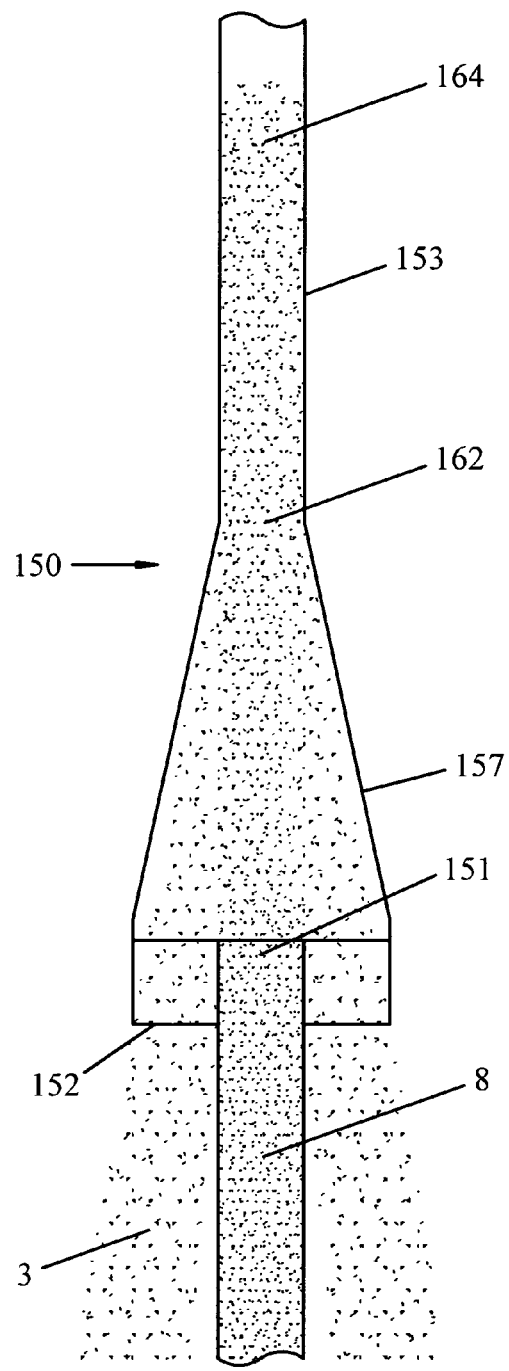
FIG. 31 is a schematic view, partly broken, of the embodiment of the present invention, as shown in FIG. 1, showing another embodiment of operation of the separator as shown in FIG. 3.

In this other embodiment of the present invention, the vertical tube 14 conveys the pneumatic material flow 8 upwardly and downstream into the first material separator 150 of the delivery system 10, which in the embodiment shown in FIG. 32 is the upstream separator 100. As shown in FIG. 31, the pneumatic material flow 8 continues approximately unchanged from the inlet 151 into the increased diametric volume of the forcing cone 157 within the material separator 150 to the through aperture 162, expanding by only a small percentage. Most of the pneumatic material flow 8 flows through the through aperture 162 upwardly to the distal side of the through aperture 162 into the cylindrical volume of the outlet tube 153 of the material separator 150. Insufficient air pressure results in a choking action 164 within the material separator 150, specifically within the cylindrical volume of the outlet tube 153 of the material separator 150, separating the material 3 from the airflow, automatically resulting in a gravimetric flow of the separated material 3 downwardly within the cylindrical volume of the outlet tube 153, through the through aperture 162 to the proximal side of the through aperture 162, and downwardly within the volume of the forcing cone 157. The flow of the separated material 3 is downwardly through an outer annular portion of the through aperture 162 simultaneously with the pneumatic material flow 8 that is upwardly through an inner central portion of the through aperture 162 as shown in FIG. 31. The outer annular portion and the inner central portion are generally coaxial with the through aperture 162. The flow of the separated material 3 is automatically deposited downwardly by gravity out of the material separator 150 through the outlet 152 and into the silo 1, forming a mound of the separated material 3 having a material surface 9. The airflow is rapidly released upwardly through the upper portion of the outlet tube 153; some of the airflow is also released downwardly through the outlet 152. The released air is vented from the silo 1 through equalizing vents (not shown).

As the material separator 150, specifically the upstream separator 100, continues to separate the material 3 in accordance with the embodiment of the present invention as shown in FIG. 31, the flow of the separated material 3 raises the level of the material surface 9 within the silo 1 to eventually meet with and block the outlet 152 as shown in FIG. 33. This blocking of the outlet 152 automatically stops the flow, and the depositing, of the separated material 3 being deposited out of the material separator 150 through the outlet 152 into the silo 1. The air pressure within the material separator 150 rises to be sufficient for continued downstream conveying, automatically stopping the separating within the material separator 150. The pneumatic material flow 8 reestablishes within the material separator 150.

The outlet tube 153, which in the embodiment shown in FIG. 1 is the vertical tube 101, conveys the reestablished pneumatic material flow 8 upwardly and downstream into the material separator 150 of the delivery system 10 that is the next material separator 150 that is downstream of the first material separator 150. In the embodiment shown in FIG. 33, that next material separator 150 is the downstream separator 200. The downstream separator 200, which is that next material separator 150, then separates the material 3 from the airflow in the identical operation as that of the previous material separator 150 (the upstream separator 100 in the embodiment shown in FIG. 32) shown in FIG. 31. As shown in FIG. 34, the flow of the separated material 3 is deposited out of the downstream separator 200 onto the mound of the material 3 that had been deposited out of the upstream separator 100, the separated material 3 falling at most only as far as the previous material separator 150 (the upstream separator 100 in the embodiment shown in FIG. 33), again raising the level of the material surface 9.

This operation of separating the material, flowing the material, depositing the material, then stopping the flowing and the depositing of the material by blocking the outlet, and then reestablishing the pneumatic material flow 8 to convey upwardly the pneumatic material flow 8 into the next material separator 150 that is downstream is repeated for each of the material separators 150 of the delivery system 10 in sequence from the bottom of the silo 1 to the top of the silo 1. The final separator in this sequence is the top separator 300, which operates in accordance with the embodiment of the present invention shown in FIG. 27 as hereinbefore described. The cap 311 redirects any flow through the second outlet 303 of the top separator 300 downwardly and out of the top separator 300 into the silo 1.

Thus, for each separator, in each of the two embodiments of the present invention of operating thereof, the separator functions selectively in either one of two modes of operation. In one mode of operation, the separator separates the material from the airflow entraining the material and flows the separated material through the outlet thereof. In another mode of operation, the airflow entraining the material flows through the separator without separating the material therefrom and without flowing separated material through the outlet thereof. The selection between the two modes of operation is automatic, based on whether the surface of the mound of the deposited material does or does not block the outlet of the separator through which the separated material is deposited onto the mound. The selectively separating and selectively flowing requires no moving parts. Thus, for each separator, the separator selectively separates the material and selectively flows the separated material into the silo to sequentially fill the silo up to the height that the separator is located within the silo.

Further, the vertical support 11 of the embodiment shown in FIG. 1 and FIG. 2, and the vertical support 401 of the embodiment shown in FIG. 12 each has a plurality of the clamp assemblies to suspend and center the series of the tubes and the separators of the delivery system of the present invention. Simultaneously, the clamp assemblies, with the sets of braces thereof and the respective wall brackets, reinforce the silo wall against collapse of the silo by resisting the bowing outwards of the silo wall from the weight of the delivery system, the weight and any movement of the stored granular material within the silo, etc.; and, if the braces are rods, by also resisting the bowing inwards of the silo wall therefrom. The clamp assemblies are structurally attached to the silo wall through the sets of braces and the plurality of brackets to distribute pressure. The distribution of the wall brackets throughout the silo provides even weight transfer to the silo wall. The two equal half clamps of the clamps of the clamp assemblies simplify construction. The clamps of the clamp assemblies provide for even load transfer and stabilization through the application of opposing clamp brackets. Suspension of the delivery system of the present invention within the silo also provides an unobstructed floor area for mechanical or manual sweeping.

In yet another embodiment of the present invention, the material 93 stored within the storage silo 99, having a support system 400 supporting a delivery system 399 as shown schematically in FIG. 12, is removed therefrom when emptying the silo 99. In order to provide the silo floor 92 to be unobstructed by the support legs of the horizontal support 408 of the support system 400 for mechanical or manual sweeping of the silo floor 92, the removable support legs of the horizontal support 408 are removed from the deployed positions thereof, and may be placed in the stored positions thereof on the horizontal support 408.

Figure 36:
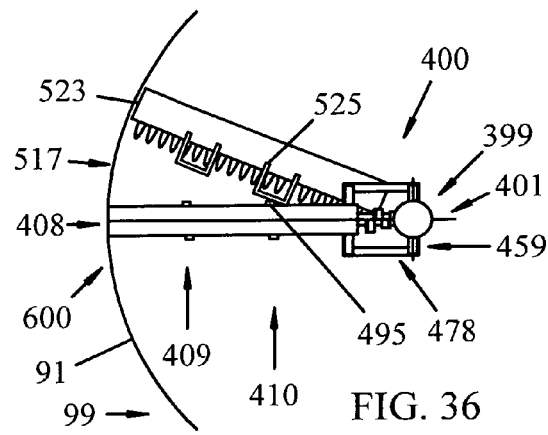
FIG. 36 is a schematic view, partly broken, of the embodiment of the present invention, as shown in FIG. 35, showing the removing and the placing of the support legs in stored positions that had been mounted in the deployed positions, and the operating of the bin sweep to continue extracting more of the material until one of the bumpers bumps into another support leg that is still mounted in the deployed position.

In this yet other embodiment of the present invention, the material 93 is extracted from the silo 99, as is known in the art, until the set 478 of the removable support legs 479, 480, 481, and 482 attached to the subframe 459 is accessible out of the material 93, as shown in FIG. 35. The interior of the silo 99 is accessed through a manual access port (not shown). The set 478 of the removable support legs 479, 480, 481, and 482 is removed from the deployed positions thereof, as shown in FIG. 36, by removing the fasteners or bolts 483, 484, 485, and 486 attaching the removable support legs 479, 480, 481, and 482 to the subframe 459 and subsequently moving the upper portions of the removable support legs 479, 480, 481, and 482 toward each other. This separates the removable support legs 479, 480, 481, and 482 from the subframe 459 and removes the locking pins thereof from the sockets therefor in the silo floor 92.

As shown in FIG. 36, the set 478 of the removable support legs 479, 480, 481, and 482 may be placed in the stored positions thereof by placing the removable support legs 479, 480, 481, and 482 adjacent the elbow brace 452 on opposite sides thereof. Each of the removable support legs 479, 480, 481, and 482 is rotated vertically ninety degrees so that one of the flanges thereof is adjacent the elbow brace and the other of the flanges thereof extends outwardly away therefrom, as shown in FIG. 23. Through holes of the removable support legs 479, 480, 482, and 481 are aligned with every other of the storing holes 455, 456, 457, and 458 of the elbow brace 452 for clearance between the removable support legs 479 and 482, and 480 and 481. When so placed, the fasteners or bolts 483, 484, 486, and 485 are then passed through the storing holes 455, 456, 457, and 458 of the elbow brace 452 and the aligned through holes of the removable support legs 479, 480, 482, and 481, respectively, and loosely secured, attaching the removable support legs 479, 480, 481, and 482 to the elbow brace 452 for removably storing the removable support legs 479, 480, 481, and 482 to the elbow brace 452 in the stored positions thereof. The removable support legs 479, 480, 482, and 481 hang downwardly from the elbow brace 452 at an angle from vertical against the elbow 392 of the delivery system 399.

Figure 38:
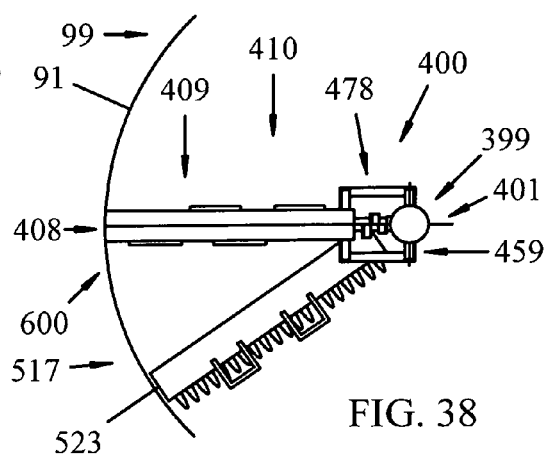
FIG. 38 is a schematic view, partly broken, of the embodiment of the present invention, as shown in FIG. 37, showing operating the bin sweep to continue extracting more material after all of the sequentially removing and placing of the support legs in the stored positions.

The silo 99 may be equipped with the bin sweep 523 having the plurality of the bin sweep bumpers 517. The bin sweep 523 may be advantageously previously positioned, when the silo 99 is approximately empty, in front of and near the removable support legs of the horizontal support 408, and in particular support legs 492 and 494 for a counterclockwise revolution of the bin sweep 523 similarly as shown in FIG. 38, such that the bin sweep 523 makes a maximum revolution before any of the bumpers 517 bumps into any of the removable support legs. (For a clockwise-revolving bin sweep so equipped with the bin sweep bumpers that is so previously positioned, that bin sweep would be in front of and near support legs 493 and 495.)

Figure 37:
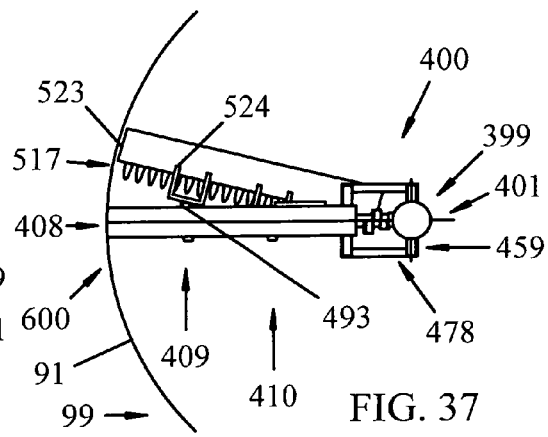
FIG. 37 is a schematic view, partly broken, of the embodiment of the present invention, as shown in FIG. 36, showing sequentially removing and placing another of the support legs in the stored position that had been mounted in the deployed position, and the continuing of the operating of the bin sweep until again one of the bumpers bumps into another support leg that is still mounted in the deployed position.

When the silo 99 is so equipped as shown in FIG. 25, subsequently the bin sweep 523 is operated to continue to extract more of the material 93 until one of the bumpers 517 bumps into the next removable support leg, that is next spaced radially outwardly from the removable support legs 479, 480, 481, and 482 attachable to the subframe 459, still mounted in the deployed position thereof, and in particular, as shown in FIG. 36, bumper 525 bumps into the removable support leg 495 attached to the clamp assembly 410. The bin sweep 523 is then stopped. The removable support leg 495 is removed from the deployed position thereof, as shown in FIG. 37, by removing the fastener or bolt 512 attaching the removable support leg 495 to the side flange of the clamp assembly 410 and subsequently moving the upper portion of the removable support leg 495 away from the clamp assembly 410. This separates the removable support leg 495 from the side flange of the clamp assembly 410 and removes the locking pin thereof from the socket therefor in the silo floor 92.

The removable support leg 495 may be placed in the stored position thereof, as shown in FIG. 37, by placing the storing hole 501 of the removable support leg 495 aligned with and below the through hole of the side flange of the clamp assembly 410. The removable support leg 495 is rotated ninety degrees from the vertical to the horizontal clockwise, so that the locking pin thereof is oriented inwardly of the silo 99, as shown in FIG. 23. When so placed, the fastener or bolt 512 is then passed through the through hole of the side flange of the clamp assembly 410 and the aligned storing hole 501 of the removable support leg 495 and secured, as by the nut when the bolt is used, attaching the removable support leg 495 to the clamp assembly 410 for removably storing the removable support leg 495 to the clamp assembly 410 in the stored position thereof.

The removable support legs attached to the clamp assemblies of the horizontal support 408 on the same side as that of the removable support leg 495, as removable support leg 493, likewise, when so rotated clockwise, orient so that the locking pins thereof are oriented inwardly of the silo 99. When the removable support legs attached to the clamp assemblies of the horizontal support 408 on the opposite side as that of the removable support leg 495, as the removable support legs 492 and 494, are so rotated clockwise, they orient so that the locking pins thereof are oriented outwardly of the silo 99, as shown in FIG. 23.

Subsequently the bin sweep 523 is again operated to continue to extract more of the material 93 until one of the bumpers 517 bumps into another of the removable support legs, that is so spaced radially outwardly, still mounted in the deployed position thereof, and in particular, as shown in FIG. 37, bumper 524 bumps into the removable support leg 493 attached to the clamp assembly 409. The bin sweep 523 is then stopped again. The removable support leg 493 is likewise removed from the deployed position thereof as was the removable support leg 495, as shown in FIG. 38, and likewise may be placed in the stored position thereof.

This sequentially operating the bin sweep 523 until one of the bumpers 517 bumps into another of the removable support legs still mounted in the deployed position thereof, stopping the bin sweep 523, and then removing that support leg which then may be placed in the stored position thereof continues until all of the removable support legs that are in the deployed positions thereof are so removed which then may be so placed stored, as shown in FIG. 38. Afterwards, the silo floor 92 is unobstructed by the removable support legs of the horizontal support 408 of the support system 400, and the bin sweep 523 can be operated without damage thereto, and/or manual sweeping can occur, to continue to extract more of the material 93 from the silo 99.

I claim:

1. A system for supporting an outlet of a conveyor depositing material to a storage, wherein the outlet is within the storage, and wherein the outlet comprises a horizontal section and a vertical section and at least an elbow interconnecting the sections, wherein said system comprises:
   a vertical support comprising:
      at least one clamp assembly mounted on the vertical section, and
      a set of braces connected to each respective said clamp assembly of said vertical support for suspending the outlet within the storage; and
   a horizontal support comprising:
      at least one clamp assembly mounted on the horizontal section,
      a set of removable support legs attachable to each respective said clamp assembly of said horizontal support for selectively supporting the outlet within the storage,
      a horizontal elbow clamp assembly mounted on the horizontal section adjacent the elbow,
      a vertical elbow clamp assembly mounted on the vertical section adjacent the elbow, and
      an elbow brace interconnecting said elbow clamp assemblies;
   wherein said support legs each has a deployed position, when attached to said respective clamp assembly of said horizontal support, for supporting the outlet within the storage.

2. A system for supporting an outlet of a conveyor depositing material to a storage, wherein the storage comprises a floor, wherein the outlet is within the storage, and wherein the outlet comprises a horizontal section and a vertical section and at least an elbow interconnecting the sections, wherein said system comprises:
   a vertical support comprising:
      at least one clamp assembly mounted on the vertical section, and
      a set of braces connected to each respective said clamp assembly of said vertical support for suspending the outlet within the storage;
   a horizontal support comprising:
      at least one clamp assembly mounted on the horizontal section, and
      a set of removable support legs attachable to each respective said clamp assembly of said horizontal support, wherein each support leg has a deployed position interconnecting said horizontal support and the storage floor for selectively supporting the outlet within the storage; and
   means for providing the storage floor to be unobstructed by each respective said support leg when said respective support leg is removed from said deployed position thereof.

3. The system of claim 2, wherein said means for providing the storage floor to be unobstructed comprises:
   a fastener for each said respective support leg removably attaching said respective support leg, when in said deployed position thereof, to said respective clamp assembly of said horizontal support.

4. A system for supporting an outlet of a conveyor depositing material to a storage, wherein the outlet is within the storage, and wherein the outlet comprises a horizontal section and a vertical section and at least an elbow interconnecting the sections, wherein said system comprises:
   a vertical support comprising:
      at least one clamp assembly mounted on the vertical section, and
      a set of braces connected to each respective said clamp assembly of said vertical support for suspending the outlet within the storage; and
   a horizontal support comprising:
      at least one clamp assembly mounted on the horizontal section,
      a set of removable support legs attachable to each respective said clamp assembly of said horizontal support for selectively supporting the outlet within the storage,
      a horizontal elbow clamp assembly mounted on the horizontal section adjacent the elbow, and
      a vertical elbow clamp assembly mounted on the vertical section adjacent the elbow;
   wherein said support legs each has a deployed position, when attached to said respective clamp assembly of said horizontal support, for supporting the outlet within the storage.

5. The system of claim 4, wherein said horizontal elbow clamp assembly comprises:

two equal halves each having two ends and an outer side having an outer surface;
a flange for each said end, wherein said flanges of adjacent said ends form end brackets, respectively;
fasteners each joining one said end bracket together, respectively; and
a flange for each said equal half evenly spaced between said ends thereof and radially perpendicular to said outer surface of said side thereof.

6. The system of claim 4, wherein said vertical elbow clamp assembly comprises:
two equal halves each having two ends and an outer side having an outer surface;
a flange for each said end, wherein said flanges of adjacent said ends form end brackets, respectively;
fasteners each connecting one said end bracket together, respectively;
a flange for each said equal half circumferentially perpendicular to said outer surface of said side thereof; and
reinforcing gussets interconnecting said circumferentially perpendicular flange and said outer surface of said side of each said equal half.

7. A system for supporting an outlet of a conveyor depositing material to a storage, wherein the outlet is within the storage, and wherein the outlet comprises a horizontal section and a vertical section and at least an elbow interconnecting the sections, wherein said system comprises:
a vertical support comprising:
at least one clamp assembly mounted on the vertical section, and
a set of braces connected to each respective said clamp assembly of said vertical support for suspending the outlet within the storage; and
a horizontal support comprising:
at least one clamp assembly mounted on the horizontal section,
a set of removable support legs attachable to each respective said clamp assembly of said horizontal support for selectively supporting the outlet within the storage,
a horizontal elbow clamp assembly mounted on the horizontal section adjacent the elbow,
a vertical elbow clamp assembly mounted on the vertical section adjacent the elbow, and
a subframe interconnecting said elbow clamp assemblies;
wherein said support legs each has a deployed position, when attached to said respective clamp assembly of said horizontal support, for supporting the outlet within the storage.

8. The system of claim 7, wherein said subframe comprises:
a plurality of interconnected girders; and
a set of stanchions for each respective said elbow clamp assembly interconnecting said respective elbow clamp assembly and said girders.

9. The system of claim 8, wherein each said stanchion comprises an upper end;
wherein each said elbow clamp assembly comprises:
two equal halves each having two ends and an outer side having an outer surface,
fasteners joining together said equal halves, and
a flange for each said equal half perpendicular to said outer surface of said side thereof; and
wherein said subframe further comprises:
a plurality of caps each attached to a respective said upper end, and
fasteners each connecting one said cap to one said flange, respectively.

10. The system of claim 7, wherein said horizontal support further comprises:
removable subframe support legs attachable to said subframe for selectively supporting the outlet within the storage;
wherein said subframe support legs each has a deployed position, when attached to said subframe, for supporting the outlet within the storage.

11. The system of claim 10, wherein each said subframe support leg comprises a first flange and a second flange; and
wherein said subframe support legs are rotationally symmetric with one said subframe support leg thereof differing from another said subframe support leg thereof, respectively, only in orientation by a rotation of ninety degrees about an axis that is parallel with both said first and second flanges of said one support leg.

12. The system of claim 10, wherein each said subframe support leg comprises an angle iron comprising a first flange and a second flange.

13. The system of claim 10, wherein each said subframe support leg comprises:
a lower end;
a foot attached to said lower end and having a lower surface; and
a locking pin attached to said lower surface.

14. The system of claim 10, wherein said horizontal support further comprises:
an elbow brace interconnecting said elbow clamp assemblies;
wherein said elbow brace comprises means for removably storing said subframe support legs in stored positions thereof.

15. The system of claim 14, wherein said horizontal support further comprises:
fasteners for said subframe support legs;
wherein said fasteners removably attach, to said subframe, said subframe support legs when in said deployed positions thereof; and
wherein said fasteners removably attach, to said removably storing means, said subframe support legs when in said stored positions thereof.

16. A system for supporting an outlet of a conveyor depositing material to a storage, wherein the outlet is within the storage, and wherein the outlet comprises a horizontal section and a vertical section and at least an elbow interconnecting the sections, wherein said system comprises:
a vertical support comprising:
at least one clamp assembly mounted on the vertical section, and
a set of braces connected to each respective said clamp assembly of said vertical support for suspending the outlet within the storage;
a horizontal support comprising:
at least one clamp assembly mounted on the horizontal section, and
a set of removable support legs attachable to each respective said clamp assembly of said horizontal support for selectively supporting the outlet within the storage;
a deflector for protecting the horizontal section; and
a set of stanchions attached to each said respective clamp assembly of said horizontal support and to said deflector for supporting said deflector above the horizontal section;

wherein said support legs each has a deployed position, when attached to said respective clamp assembly of said horizontal support, for supporting the outlet within the storage.

17. The system of claim 16, wherein each said stanchion comprises:
   a lower end, and
   a foot attached to said lower end;
   wherein each said clamp assembly of said horizontal support comprises:
      two equal halves each having two ends and an outer side having an outer surface,
      fasteners joining together said equal halves, and
      a flange for each said equal half perpendicular to said outer surface of said side thereof; and
   wherein said system further comprises:
      fasteners each attaching one said foot to one said flange, respectively.

18. The system of claim 17, wherein each said support leg comprises:
   an upper end, and
   a cap attached to said upper end; and
   wherein:
      said one foot and one said cap sandwich said one flange, respectively, and
      said fasteners, that attach said feet to said flanges respectively, also removably attach, to said flanges, said support legs at said caps, respectively, when in said deployed positions thereof.

19. The system of claim 16, wherein said deflector comprises:
   a first angled wall;
   a second angled wall; and
   a plurality of crossbeams interconnecting said angled walls for reinforcing said deflector.

20. The system of claim 16, wherein the storage comprises a wall; and
   wherein said deflector comprises:
      an end adjacent to the storage wall, and
      a flange fastened to the storage wall for supporting said end.

21. A system for supporting an outlet of a conveyor depositing material to a storage, wherein the outlet is within the storage, and wherein the outlet comprises a horizontal section and a vertical section and at least an elbow interconnecting the sections, wherein said system comprises:
   a vertical support comprising:
      at least one clamp assembly mounted on the vertical section, and
      a set of braces connected to each respective said clamp assembly of said vertical support for suspending the outlet within the storage; and
   a horizontal support comprising:
      at least one clamp assembly mounted on the horizontal section, and
      a set of removable support legs attachable to each respective said clamp assembly of said horizontal support for selectively supporting the outlet within the storage;
   wherein said support legs each has a deployed position, when attached to said respective clamp assembly of said horizontal support, for supporting the outlet within the storage;
   wherein each said support leg comprises:
      a first flange, and
      a second flange; and
   wherein said second flange for each said support leg comprises means for removably storing said support leg thereof on said respective clamp assembly of said horizontal support in a stored position thereof.

22. The system of claim 21, wherein each said clamp assembly of said horizontal support comprises:
   two equal halves each having two ends and an outer side having an outer surface;
   a flange for each said end, wherein said flanges of adjacent said ends form end brackets, respectively;
   fasteners each joining one said end bracket together, respectively; and
   a flange for each said equal half evenly spaced between said ends thereof and radially perpendicular to said outer surface of said side thereof.

23. The system of claim 21, wherein said support legs of each said set thereof are rotationally symmetric with one said support leg of said set thereof differing from another said support leg of said set thereof, respectively, only in orientation by a rotation of one hundred eighty degrees about an axis that is parallel with both said first and second flanges of said one support leg, respectively.

24. The system of claim 21, wherein each said support leg further comprises:
   an upper leg section;
   a lower leg section offset from said upper leg section; and
   fasteners attaching together said leg sections.

25. The system of claim 24, wherein each said leg section comprises an angle iron.

26. The system of claim 21, wherein each said clamp assembly of said horizontal support comprises:
   two equal halves each having two ends and an outer side having an outer surface,
   fasteners joining together said equal halves, and
   a flange for each said equal half perpendicular to said outer surface of said side thereof;
   wherein each said support leg further comprises:
      an upper end, and
      a cap attached to said upper end;
   wherein said horizontal support further comprises:
      fasteners for said support legs;
   wherein said fasteners for said support legs removably attach, to said flanges of said respective clamp assembly of said horizontal support, said support legs at said caps, respectively, when in said deployed positions thereof; and
   wherein said fasteners for said support legs removably attach, to said flanges of said respective clamp assembly of said horizontal support, said support legs at said removably storing means, respectively, when in said stored positions thereof.

27. The system of claim 21, wherein each said support leg further comprises:
   a lower end;
   a foot attached to said lower end and having a lower surface; and
   a locking pin attached to said lower surface.

* * * * *